United States Patent
Shimoshikiryoh et al.

(10) Patent No.: US 11,562,702 B2
(45) Date of Patent: Jan. 24, 2023

(54) DIMMING UNIT, AND LIQUID CRYSTAL DISPLAY DEVICE

(71) Applicant: Sharp Kabushiki Kaisha, Sakai (JP)

(72) Inventors: Fumikazu Shimoshikiryoh, Sakai (JP); Shigeyuki Yamada, Sakai (JP); Takehisa Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 118 days.

(21) Appl. No.: 17/213,316

(22) Filed: Mar. 26, 2021

(65) Prior Publication Data
US 2021/0304687 A1 Sep. 30, 2021

Related U.S. Application Data

(60) Provisional application No. 63/002,387, filed on Mar. 31, 2020.

(51) Int. Cl.
*G09G 3/34* (2006.01)
*G02F 1/1335* (2006.01)
(Continued)

(52) U.S. Cl.
CPC ....... *G09G 3/3413* (2013.01); *G02F 1/13471* (2013.01); *G02F 1/133601* (2021.01);
(Continued)

(58) Field of Classification Search
CPC ............. G02F 1/1347; G02F 1/133601; G02F 1/13471; G02F 1/134372; G02F 1/134363;
(Continued)

(56) References Cited

U.S. PATENT DOCUMENTS 6,104,450 A * 8/2000 Hiraishi ............ G02F 1/136213
349/48
8,089,450 B2 * 1/2012 Tachibana .......... H05B 41/3927
341/61
(Continued)

FOREIGN PATENT DOCUMENTS

CN 209148998 U * 7/2019 ........... G02F 1/0305
CN 106952621 B * 10/2019 ........... G02B 6/0035
(Continued)

*Primary Examiner* — Vinh T Lam
(74) *Attorney, Agent, or Firm* — Keating & Bennett, LLP

(57) ABSTRACT

The present invention relates to a dimming unit including: a dimming panel; and drive circuitry, the dimming panel sequentially including a first substrate, a liquid crystal layer, and a second substrate, the first substrate sequentially including an insulating substrate, a lower-layer electrode, a first insulating layer, multiple first electrodes, a second insulating layer, and a second electrode which is provided with multiple parallel linear electrodes and to which a constant voltage is applied, the first electrodes including multiple island electrodes which are spaced from each other in a plan view and are electrically connected to each other, at least one of the island electrodes being electrically connected to the lower-layer electrode through a contact hole, the drive circuitry controlling voltages applied to the respective first electrodes.

18 Claims, 25 Drawing Sheets

(51) Int. Cl.
  *G02F 1/1347* (2006.01)
  *G02F 1/1343* (2006.01)
  *G09G 3/36* (2006.01)

(52) U.S. Cl.
  CPC .. *G02F 1/133612* (2021.01); *G02F 1/134363* (2013.01); *G02F 1/134372* (2021.01); *G09G 3/3406* (2013.01); *G09G 3/36* (2013.01); *G02F 2201/122* (2013.01); *G09G 2300/0426* (2013.01); *G09G 2300/0452* (2013.01)

(58) Field of Classification Search
  CPC ........ G02F 1/133612; G02F 2201/122; G09G 3/3413; G09G 3/3406; G09G 3/3607; G09G 3/36; G09G 2300/0426; G09G 2300/0452
  See application file for complete search history.

(56) References Cited

U.S. PATENT DOCUMENTS

| | | | |
|---|---|---|---|
| 9,240,144 B2* | 1/2016 | Cho | G09G 3/3426 |
| 9,295,112 B2* | 3/2016 | Knapp | H05B 45/20 |
| 9,595,229 B2* | 3/2017 | Cho | G09G 3/3426 |
| 9,601,062 B2* | 3/2017 | An | G09G 3/3413 |
| 9,857,632 B2* | 1/2018 | Lee | G02F 1/133611 |
| 10,311,801 B2* | 6/2019 | Otoi | G09G 3/36 |
| 10,591,769 B2* | 3/2020 | Harada | G09G 3/3648 |
| 10,642,097 B2* | 5/2020 | Kumamoto | G02F 1/133603 |
| 10,663,793 B2* | 5/2020 | Kumamoto | G02F 1/133308 |
| 10,670,918 B2* | 6/2020 | Lee | G09G 3/342 |
| 11,107,440 B2* | 8/2021 | Aurongzeb | H04W 4/30 |
| 11,410,618 B2* | 8/2022 | Shimoshikiryoh | G02F 1/133601 |
| 2009/0303265 A1* | 12/2009 | Kanou | G09G 3/3655 345/690 |
| 2010/0134405 A1* | 6/2010 | Park | G02B 6/005 345/102 |
| 2012/0162276 A1* | 6/2012 | Jang | G09G 3/3426 345/89 |
| 2019/0069374 A1* | 2/2019 | Shivell | H01H 13/83 |
| 2019/0162960 A1* | 5/2019 | Harada | G02F 1/133603 |
| 2020/0019010 A1* | 1/2020 | Usukura | G02F 1/13476 |
| 2021/0012727 A1* | 1/2021 | Chang | G09G 3/3426 |

FOREIGN PATENT DOCUMENTS

| | | | |
|---|---|---|---|
| CN | 113467134 A * | 10/2021 | ....... G02F 1/133612 |
| WO | 2008/053724 A1 | 5/2008 | |

* cited by examiner

DIMMING UNIT, AND LIQUID CRYSTAL DISPLAY DEVICE

CROSS-REFERENCE TO RELATED APPLICATIONS

The present application claims priority under 35 U.S.C. § 119 to U.S. provisional Patent Application No. 63/002,387 filed on Mar. 31, 2020, the contents of which are incorporated herein by reference in their entirety.

BACKGROUND OF THE INVENTION

Field of the Invention

The present invention relates to dimming units and liquid crystal display devices including the dimming unit.

Description of Related Art

Dimming panels are panels that can control the transmittance of light in response to the voltage applied to the panel. For example, a dimming panel can be used as an optical member that is placed between an image-providing liquid crystal panel and a backlight and controls the amount of backlight illumination transmitted, or as a member that controls the amount of external light transmitted into a building, a vehicle, or the like. One of dimming methods using such a dimming panel includes preparing a liquid crystal composition sealed between a pair of substrates and applying a voltage to the liquid crystal composition and thereby changing the alignment of liquid crystal molecules and controlling the amount of light transmitted through the dimming panel. A device including the dimming panel and control circuitry for controlling the dimming panel is also referred to as a dimming unit.

Liquid crystal display devices are display devices utilizing a liquid crystal composition to display images. In a typical display mode thereof, a liquid crystal panel containing a liquid crystal composition between a pair of substrates is irradiated with light from a backlight and voltage is applied to the liquid crystal composition to change the alignment of liquid crystal molecules, whereby the amount of light transmitted through the liquid crystal panel is controlled. Such liquid crystal display devices have advantageous features such as thin profile, light weight, and low power consumption, and are therefore used in electronic devices such as televisions, smartphones, tablet PCs, and automotive navigation systems.

A study on liquid crystal display devices has been made for achieving a uniform luminance distribution on the light emitting surface of a backlight by disposing a dimming panel between an image-providing liquid crystal panel and the backlight. For example, WO 2008/053724 discloses a liquid crystal display device including: an image-providing panel that includes a liquid crystal display panel; a light source for illuminating the liquid crystal display panel; and a dimming panel disposed between the image-providing panel and the light source, the dimming panel including a transmissive liquid crystal display panel and performing gray scale display based on luminance information in a video image signal input to the image-providing panel, wherein the dimming panel includes pixels having a size greater than pixels constituting the image-providing panel. The "pixels constituting the dimming panel" in WO 2008/053724 correspond to "dimming units" herein. The "dimming units" will be described later.

BRIEF SUMMARY OF THE INVENTION

A study on methods for displaying a high quality image has been made aiming to develop a liquid crystal display device capable of performing high dynamic range (HDR) imaging. The HDR imaging enables display of a clearer image with a wider brightness range than an image with a conventional dynamic range (standard dynamic range, SDR). In order to display an image with a wider brightness range by HDR imaging, the liquid crystal display device is required to have an increased maximum luminance and an increased contrast ratio.

A method for increasing the contrast ratio of a liquid crystal display device includes dividing the light emitting surface of a backlight into multiple illuminating areas and separately driving these areas (local dimming). Unfortunately, the illuminating areas for local dimming have a significantly greater size than the pixel size of the image-providing liquid crystal panel. This may result in a halo phenomenon that causes a portion which should be displayed dark to look brightly at a boundary between images with a large difference in brightness.

The present inventors studied another method for increasing the contrast ratio of a liquid crystal display device, including disposing a dimming panel between an image-providing liquid crystal panel and a backlight. The study demonstrated that provision of a dimming panel can control the amount of light emitted from the backlight (hereinafter, also referred to as backlight illumination) and transmitted through each dimming unit constituting the dimming panel, which can reduce the halo phenomenon while increasing the contrast ratio of the liquid crystal display device.

Sophisticated large displays used for a master monitor or the like have been developed recently. When a dimming panel is applied to such a sophisticated display, excellent viewing angle characteristics are required not only for the image-providing liquid crystal panel but also for the dimming panel.

Examples of a dimming panel having excellent viewing angle characteristics include horizontally aligned dimming panels. For example, a horizontally aligned dimming panel has a structure including a first substrate provided with a first electrode and a second electrode with an insulating layer in between, a second substrate disposed opposite the first substrate, and a liquid crystal layer sealed between the first substrate and the second substrate. The horizontally aligned dimming panel controls the amount of light transmitted through the dimming panel by changing the alignment azimuth of liquid crystal molecules in the liquid crystal layer with an electric field formed between the first electrode and the second electrode. One of the first electrode and the second electrode is an electrode for applying a predetermined voltage to each dimming unit (hereinafter, also referred to as a dimming unit electrode) and the other is an electrode for applying a constant voltage to the entire dimming panel beyond the boundaries of the dimming units. Preferably, at least one of the dimming unit electrode or the electrode for applying a constant voltage to the entire dimming panel includes multiple linear electrodes and thereby can form an electric field with the other electrode through the spaces (slits) between the linear electrodes.

A study made in WO 2008/053724 is that in order to smooth the luminance difference between dimming units, the boundary between adjacent dimming units constituting the dimming panel is made irregular (zigzag) and thereby the luminance distribution is smoothly changed. According to studies by the present inventors, however, in a horizontally aligned dimming panel, making a boundary between dimming units zigzag as disclosed in WO 2008/053724 fails to smoothly change the luminance distribution and rather causes zigzag dark lines. When a dimming panel having an unsmooth luminance distribution provides images of different scales in adjacent dimming units, the luminance difference between the dimming units unfortunately becomes remarkable. Dimming units constituting a dimming panel are larger than the pixels constituting the image-providing liquid crystal panel, and thus the outlines thereof are unintendedly recognized in some cases when the dimming panel is stacked on the image-providing liquid crystal panel. Studies by the present inventors further revealed that in display with a horizontally aligned dimming panel, liquid crystal molecules possibly have an alignment defect at the boundaries between dimming units and thereby cause dark lines. Appearance of such dark lines emphasizes the boundaries between dimming units, and thereby not only reduces the display quality of the dimming panel but also reduces the transmittance of the dimming panel.

There is room for studying the electrode shape at the boundary between adjacent dimming units in order to smooth the luminance distribution between adjacent dimming units. Unfortunately, in the case of providing multiple linear electrodes to the dimming unit electrode, it is difficult to form the linear electrodes with a complicated electrode shape for each dimming unit while satisfying the electrode width and slit width capable of forming a fringe electric field.

In addition to serving as a member of a liquid crystal display device as described above, the dimming panel by itself can serve as an anti-glare panel that controls the amount of external light transmitted. When such an anti-glare panel used as a vehicle-mounted sun visor, for example, has dark lines at boundaries between dimming units, the dark lines interrupt the passenger's view. Thus, a dimming panel that sufficiently restricts the occurrence of dark lines is awaited.

The present invention is made under the current situation in the art and aims to provide a dimming unit that allows a complicated electrode shape design and has a high transmittance and a smooth change in luminance distribution, and a liquid crystal display device including the dimming unit.

(1) One embodiment of the present invention is directed to a dimming unit including: a dimming panel; and drive circuitry, the dimming panel sequentially including a first substrate, a liquid crystal layer, and a second substrate, the first substrate sequentially including an insulating substrate, a lower-layer electrode, a first insulating layer, multiple first electrodes, a second insulating layer, and a second electrode which is provided with multiple parallel linear electrodes and to which a constant voltage is applied, the first electrodes including multiple island electrodes which are spaced from each other in a plan view and are electrically connected to each other, at least one of the island electrodes being electrically connected to the lower-layer electrode through a contact hole, the drive circuitry controlling voltages applied to the respective first electrodes.

(2) In an embodiment of the present invention, the dimming panel includes the structure (1), the island electrodes are arranged in a manner that an electrode area occupancy decreases toward an outer periphery of each of the first electrodes, at least one of the island electrodes of a selected electrode of the first electrodes is disposed in a position between the island electrodes of a next electrode, and at least one of the island electrodes of the next electrode is disposed in a position between the island electrodes of the selected electrode.

(3) In an embodiment of the present invention, the dimming panel includes the structure (2), and the lower-layer electrode overlaps a space between the island electrodes of the selected electrode and the island electrodes of the next electrode in a plan view.

(4) In an embodiment of the present invention, the dimming panel includes any one of the structures (1) to (3), and at least one of the island electrodes has a quadrangular planar shape.

(5) In an embodiment of the present invention, the dimming panel includes any one of the structures (1) to (4), and at least one of the island electrodes has an outer peripheral shape including a linear portion that forms an angle of −30° to +30° with respect to an extending direction of the linear electrodes of the second electrode, provided that in a view seen from a second substrate end, an angle formed in a clockwise direction is defined to be a negative angle and an angle formed in a counterclockwise direction is defined to be a positive angle.

(6) In an embodiment of the present invention, the dimming panel includes any one of the structures (1) to (3), and at least one of the island electrodes has a planar shape including a curved portion.

(7) In an embodiment of the present invention, the dimming panel includes any one of the structures (1) to (6), and the first substrate includes multiple connection lines connecting the respective first electrodes and the drive circuitry.

(8) In an embodiment of the present invention, the dimming panel includes any one of the structures (1) to (7), each of the first electrodes further includes a base electrode provided with multiple apertures, the island belectrodes surround the base electrode in a plan view, the base electrode is electrically connected to the lower-layer electrode through another contact hole, at least one of the island electrodes of a selected electrode of the first electrodes is disposed in a position inside at least one of the apertures of a next electrode, and at least one of the island electrodes of the next electrode is disposed in a position inside at least one of the apertures of the selected electrode.

(9) In an embodiment of the present invention, the dimming panel includes the structure (8), and the apertures provided in the base electrode are arranged in a manner that an aperture area occupancy increases from a center toward an outer periphery of the base electrode.

(10) In an embodiment of the present invention, the dimming panel includes the structure (8) or (9), and the lower-layer electrode overlaps a space between the apertures provided in the base electrode of the selected electrode and the island electrodes of the next electrode in a plan view.

(11) In an embodiment of the present invention, the dimming panel includes any one of the structures (8) to (10), and at least one of the apertures has a quadrangular outer peripheral shape.

(12) In an embodiment of the present invention, the dimming panel includes any one of the structures (8) to (11), and the at least one aperture has an outer peripheral shape including a linear portion that forms an angle of −30° to +300 with respect to an extending direction of the linear electrodes of the second electrode, provided that in a view seen from a second substrate end, an angle formed in a clockwise direction is defined to be a negative angle and an angle formed in a counterclockwise direction is defined to be a positive angle.

(13) In an embodiment of the present invention, the dimming panel includes any one of the structures (8) to (10), and at least one of the apertures includes an outer peripheral shape including a curved portion.

(14) One embodiment of the present invention is directed to a liquid crystal display device including: an image-providing liquid crystal panel; a backlight; and a dimming unit between the image-providing liquid crystal panel and the backlight, the dimming unit including: a dimming panel; and drive circuitry, the dimming panel sequentially including a first substrate, a liquid crystal layer, and a second substrate, the first substrate sequentially including an insulating substrate, a lower-layer electrode, a first insulating layer, multiple first electrodes, a second insulating layer, and a second electrode which is provided with multiple parallel linear electrodes and to which a constant voltage is applied, the first electrodes including multiple island electrodes which are spaced from each other in a plan view and are electrically connected to each other, at least one of the island electrodes being electrically connected to the lower-layer electrode through a contact hole, the drive circuitry controlling voltages applied to the respective first electrodes.

(15) In an embodiment of the present invention, the dimming panel includes the structure (14), the image-providing liquid crystal panel includes multiple pixels including sub-pixels of multiple colors and being arranged in a matrix in a plane, and the island electrodes include an overlapping electrode portion overlapping the sub-pixels of all colors included in one pixel.

(16) In an embodiment of the present invention, the dimming panel includes the structure (15), and in the overlapping electrode portion, a difference between a maximum value and a minimum value among electrode areas overlapping the respective sub-pixels of the respective colors is 30% or less of the maximum value.

(17) In an embodiment of the present invention, the dimming panel includes the structure (14) or (15), the image-providing liquid crystal panel includes multiple pixels including sub-pixels of multiple colors and being arranged in a matrix in a plane, and the apertures include an overlapping aperture portion overlapping the sub-pixels of all colors included in one pixel.

(18) In an embodiment of the present invention, the dimming panel includes the structure (17), and in the overlapping aperture portion, a difference between a maximum value and a minimum value among aperture areas overlapping the respective sub-pixels of the respective colors is 30% or less of the maximum value.

The present invention can provide a dimming unit that allows a complicated electrode shape design and has a high transmittance and a smooth change in luminance distribution, and a liquid crystal display device including the dimming unit.

DETAILED DESCRIPTION OF THE INVENTION

Figure 1:
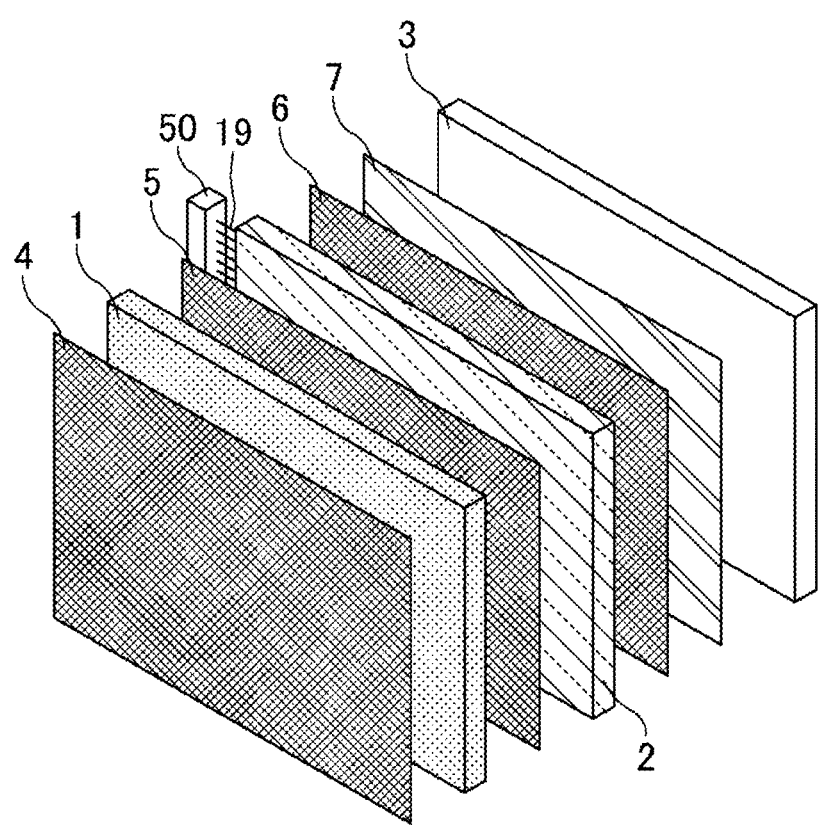
FIG. 1 is an exploded perspective view of a liquid crystal display device of Example 1.

Hereinafter, a dimming unit and a liquid crystal display device according to an embodiment of the present invention are described. The embodiment, however, is not intended to limit the scope of the present invention. The design may be modified as appropriate within the range satisfying the configuration of the present invention.

<Dimming Unit>

A dimming unit according to an embodiment of the present invention sequentially includes: a dimming panel; and drive circuitry, the dimming panel sequentially including a first substrate, a liquid crystal layer, and a second substrate, the first substrate sequentially including an insulating substrate, a lower-layer electrode, a first insulating layer, multiple first electrodes, a second insulating layer, and a second electrode which is provided with multiple parallel linear electrodes and to which a constant voltage is applied, the first electrodes including multiple island electrodes which are spaced from each other in a plan view and are electrically connected to each other, at least one of the island electrodes being electrically connected to the lower-layer electrode through a contact hole, the drive circuitry controlling voltages applied to the respective first electrodes.

The dimming panel sequentially includes a first substrate, a liquid crystal layer, and a second substrate. The first substrate sequentially includes an insulating substrate, a lower-layer electrode, a first insulating layer, multiple first electrodes, a second insulating layer, and a second electrode which includes parallel linear electrodes and to which a constant voltage is applied. In other words, the dimming panel is a horizontally aligned dimming panel. A horizontally aligned dimming panel has excellent viewing angle characteristics and is thus suitably used for a large liquid crystal display device such as a master monitor that is required to have high display quality.

The following describes a dimming method using the dimming panel. When a constant voltage is applied to the second electrode and the driving circuitry applies predetermined voltages to the respective first electrodes, an electric field is formed in the liquid crystal layer. The second electrode includes parallel linear electrodes. Thus, a fringe electric field is formed between the first electrodes and the linear electrodes and thereby changes the alignment azimuth of liquid crystal molecules in the liquid crystal layer. The dimming panel may be sandwiched between a pair of linear polarizers. The linear polarizers may be disposed with their absorption axes being perpendicular to each other. Forming an angle between the alignment azimuth of the liquid crystal molecules and the absorption axis of each linear polarizer enables controlling the amount of backlight illumination transmitted through the dimming panel and thereby can provide gray scale display. The polarizer placed on the image-providing liquid crystal panel end may also serve as one of paired polarizers sandwiching the image-providing liquid crystal panel.

A structure in which a constant voltage is applied to the second electrode provided with the linear electrodes and each first electrode applies a predetermined voltage to the corresponding dimming unit eliminates the need for providing linear electrodes for forming a fringe electric field in the first electrode and thus allows the first electrodes to have any electrode shape as long as an electric field can be formed with the second electrode. Accordingly, a complicated electrode shape such as a shape including multiple island electrodes can be formed as described below. According to the studies by the present inventors, in a diming panel that includes as a dimming unit electrode an electrode provided with multiple linear electrodes and as a solid electrode an electrode that applies a constant voltage to the entire dimming panel, for example, the extending direction of the linear electrodes, the electrode width of the linear electrodes, and the slit width between the linear electrodes need to be designed within a range where a fringe electric field can be formed with the solid electrode. Thus, the dimming unit electrode has limitation for its design, which makes it difficult to form a complicated electrode shape such as the shape including multiple island electrodes.

The linear electrodes of the second electrode may form an angle of 75° or greater and 85° or smaller with the absorption axis of one of the polarizers sandwiching the dimming panel. The second electrode may be disposed on the entire dimming panel beyond the boundaries between dimming units. For example, a predetermined reference voltage may be applied to the second electrode or the second electrode may be grounded.

The liquid crystal layer contains liquid crystal molecules. The liquid crystal molecules may have a positive anisotropy of dielectric constant ($\Delta\varepsilon$) (positive type) or a negative anisotropy of dielectric constant (negative type) defined by the following formula. The liquid crystal material used in the liquid crystal layer of the dimming panel may be the same as or different from the liquid crystal material used in the liquid crystal layer of the image-providing liquid crystal panel described later. In order to improve the reliability, the liquid crystal material used in the liquid crystal layer of the dimming panel preferably has better resistance to high temperature and high luminance than the liquid crystal material used in the liquid crystal layer of the image-providing liquid crystal panel.

$\Delta\varepsilon$=(dielectric constant in major axis direction of liquid crystal molecules)−(dielectric constant in minor axis direction of liquid crystal molecules)  (L)

The first electrodes each include multiple island electrodes that are spaced from each other in a plan view and are electrically connected to each other. At least one island electrode is electrically connected to the lower-layer electrode through a contact hole. Regions provided with the respective first electrodes in a plan view are herein referred to as dimming units. In other words, the dimming panel includes multiple dimming units arranged in an in-plane direction. In a plan view, the island electrodes seem to be scattered with a specific distance in between. Actually, the lower-layer electrode electrically connects the island electrodes. Thus, the same voltage can be applied to the island electrodes constituting one first electrode. The first electrodes including island electrodes can smooth the change in gray scale distribution between adjacent dimming units. The island electrodes may each be electrically connected to the lower-layer electrode through the contact holes.

The drive circuitry controls voltages applied to the respective first electrodes. In the case where a predetermined reference voltage is applied to the second electrode, the drive circuitry may control the constant voltage applied to the second electrode.

The island electrodes may be arranged in a manner that the electrode area occupancy decreases toward the outer periphery of the first electrode. The electrode area occupancy refers to the proportion of the total electrode area of island electrodes in a predetermined unit area in one dimming unit. The arrangement of the island electrodes in a manner that the electrode area occupancy thereof decreases toward the outer periphery of the first electrode in a plan view allows the center portion of the first electrode to have the highest luminance and allows the luminance to moderately decrease toward the outer periphery. The electrode area occupancy may be decreased by arranging the island electrodes in a manner that the electrode area decreases toward the outer periphery of the first electrode or by reducing the number of island electrodes toward the outer periphery of the first electrode. The outer periphery of the first electrode corresponds to a line connecting the island electrodes disposed at the farthest positions from the center of the first electrode in a plan view. The outer periphery of the base electrode may not be a linear periphery and may have an irregular portion.

At least one island electrode included in a selected electrode of the first electrodes may be disposed in a position between adjacent two of the island electrodes of in a next electrode, and at least one island electrode included in the next electrode may be disposed in a position between adjacent two of the island electrodes of the selected electrode. Such an arrangement smooths the change in luminance distribution between adjacent first electrodes and thereby allows the boundary between regions with the first electrodes (dimming units) to be less recognizable. In other words, provided that one of the adjacent first electrodes is defined as an electrode A and the other thereof is defined as an electrode B, the region with the electrode A (dimming unit A) and the region with the electrode B (dimming unit B) are overlapped.

The island electrodes are spaced from each other in a plan view. Thus, part of island electrodes of the electrode A can be disposed between island electrodes of the electrode B. Similarly, part of island electrodes of the electrode B can be disposed between island electrodes of the electrode A. The island electrodes of the electrode A may be arranged in a manner that the electrode area occupancy decreases from the center of the electrode A toward the center of the electrode B, and the island electrodes of the electrode B may be arranged in a manner that the electrode area occupancy decreases from the center of the electrode B toward the center of the electrode A. For example, the island electrodes of the electrode A may be arranged in a manner that the electrode area decreases from the center of the electrode A toward the center of the electrode B, and the island electrodes of the electrode B may be arranged in a manner that the electrode area decreases from the center of the electrode B toward the center of the electrode A. Alternatively, the island electrodes of the electrode A may be arranged in a manner that the number of electrodes decreases from the center of the electrode A toward the center of the electrode B, and the island electrodes of the electrode B may be arranged in a manner that the number of electrodes decreases from the center of the electrode B toward the center of the electrode A.

The lower-layer electrode may overlap spaces between the island electrodes of the selected electrode and the island electrodes of the next electrode in a plan view. The boundary portion between the electrode A and the electrode B may have inactive liquid crystal molecules as a result of receiving both influences of an electric field formed between the electrode A and the second electrode and of an electric field formed between the electrode B and the second electrode, and thereby have an alignment defect which may be recognized as a dark line. Disposing the lower-layer electrode to overlap a space between the electrode A and the electrode B in a plan view can form an electric field between the lower-layer electrode and the second electrode. This electric field can change the alignment of liquid crystal molecules in the boundary portion between the electrode A and the electrode B and thereby can restrict the occurrence of a dark line. This structure thus can restrict a reduction in display quality caused by dark lines and can increase the luminance of the dimming panel. The lower-layer electrode may be formed in a cyclic shape along the outer periphery formed by connecting outer island electrodes.

The first substrate may include multiple connection lines connecting the respective first electrodes and the drive circuitry. In other words, preferably, the first electrodes are connected to the drive circuitry through the respective connection lines and are driven in a segment driving mode in which the voltages applied to the respective first electrodes are separately controlled. An example of other driving methods is a matrix driving mode in which a switching element such as a TFT is disposed in each dimming unit and a voltage applied to the first electrodes is controlled for each dimming unit. In the matrix driving mode, the first electrodes are to be charged in a short period of time such as one horizontal scan period. Thus, in a dimming panel used for a large liquid crystal display device such as in particular a 30-inch display, metal lines formed from a metal material with high electrical conductivity, such as copper, aluminum, titanium, or molybdenum, are suitably used for members connected to the TFT, such as a drain electrode and lines including gate lines and source lines. In the matrix driving mode, the reliability of a dimming panel may be reduced because the dimming panel is exposed to backlight illumination and thereby the threshold voltage of TFTs is shifted and off-state leakage current is generated. In contrast, in the segment driving mode, the first electrodes can be charged in a period of time corresponding to one frame. Thus, the charging can be sufficiently achieved even when the connection lines are made of a transparent electrode material such as indium tin oxide (ITO) or indium zinc oxide (IZO) which has lower electrical conductivity than the above metal material. Besides, this method includes no TFTs and thus can avoid a reduction in reliability due to shifting of the threshold voltage of TFTs.

The connection lines may be formed of a transparent electrode material such as ITO or IZO. When the connection lines are metal lines formed of the metal material, the dimming panel has a reduced transmittance. In addition, when the dimming panel is stacked above the image-providing liquid crystal panel described later, the connection lines may interfere with members of the image-providing liquid crystal panel, such as lines including gate lines and source lines and black matrix, which may cause moiré. In order to reduce the moiré, a diffuser is typically disposed between the image-providing liquid crystal panel and the dimming panel. However, use of the diffuser further reduces the transmittance of the liquid crystal display device. In contrast, use of transparent electrodes as the connection lines can increase the transmittance of the dimming panel and can restrict the occurrence of moiré. Furthermore, the transmittance of the liquid crystal display device can be increased because no diffuser for reducing the moiré is disposed.

The planar shape of at least one island electrode may include a linear portion and may be, for example, a shape such as a quadrangle including a rectangle, a square, and a rhombus. The planar shape of at least one island electrode may include a curved portion and may be, for example, a shape such as a circle or an ellipse. Furthermore, the planar shape of at least one island electrode may have a shape formed by a combination of a linear portion and a curved portion. The outer peripheral shape of at least one aperture may include a linear portion and may be, for example, a shape such as a quadrangle including a rectangle, a square, and a rhombus. The outer peripheral shape of at least one aperture may include a curved portion and may be, for example, a shape such as a circle or an ellipse. Furthermore, the outer peripheral shape of at least one aperture may have a shape formed by a combination of a linear portion and a curved portion. The planar shape of at least one island electrode and the outer peripheral shape of at least one aperture may each be designed according to the planar shape of pixels constituting the image-providing liquid crystal panel described later.

At least one island electrode may have an outer peripheral shape including a linear portion that forms an angle of −30° to +30° with respect to the extending direction of the linear electrodes of the second electrode, provided that in a view from the second substrate end, an angle formed in the clockwise direction is defined to be a negative angle and an angle formed in the counterclockwise direction is defined to be a positive angle. When at least one of the island electrodes is disposed in a position between adjacent two of the island electrodes of the base electrode of a next first electrode, adjacent first electrodes are opposed to each other with a space (gap) in between. As described above, the first electrodes form a fringe electric field with the linear electrodes of the second electrode stacked above the first electrodes with an insulating layer in between. Portions where the gaps between the adjacent first electrodes cross the linear electrodes in a plan view tend to have an alignment defect due to insufficient movement of liquid crystal molecules. Setting the angle formed by the linear portion and the extending direction of the linear electrodes (hereinafter, also referred to as angle θy) to −30° to +30° increases the distance between adjacent regions with an alignment defect (portions where the gaps cross the linear electrodes) and thus allows dark lines to be less recognizable. In contrast, an angle θy of smaller than −30° or greater than +30° reduces the distance between adjacent regions with an alignment defect and may cause dark lines to be recognizable. The angle θy is more preferably −15° to +15°. The outer periphery of the island electrode includes at least one linear portion described above, and may include multiple linear portions. At least one of the linear portions preferably forms an angle of −30° to +30°, more preferably an angle of −15° to +15°, with the extending direction of the linear electrodes. Preferably, a larger number of linear portions form an angle of −30° to +30°, more preferably an angle of −15° to +15°, with the extending direction of the linear electrodes.

Each of the first electrodes may further include a base electrode provided with multiple apertures, and the island electrodes may surround the base electrode in a plan view. Provided that one of two adjacent first electrodes is defined as the electrode A and the other is defined as the electrode B, formation of multiple apertures in the base electrode allows part of the island electrodes of the electrode A to be disposed inside the apertures provided in the base electrode of the electrode B. Similarly, this structure allows part of the island electrodes of the electrode B to be disposed inside the apertures provided in the base electrode of the electrode A. Also, the island electrodes arranged so as to surround the base electrode in a plan view can control the spreading of light transmitted through each dimming unit. The base electrode may be disposed in the center of one dimming unit, or the center of the base electrode may overlap the center of the first electrode. When each of the first electrodes includes a base electrode, the island electrodes may be arranged in a manner that the electrode area occupancy decreases from the center of the base electrode (center of the first electrode) toward the outer periphery of the first electrode.

At least one island electrode of a selected electrode of two adjacent first electrodes may be disposed inside at least one aperture of the next electrode. At the same time, at least one island electrode of the next electrode may be disposed inside at least one aperture provided in the selected electrode. Part of the island electrodes of the electrode A may be disposed in a position inside the apertures provided in the electrode B and in a position between the island electrodes of the electrode B, or in a position inside the apertures provided in the electrode B or in a position between the island electrodes of the electrode B. Similarly, part of the island electrodes of the electrode B may be disposed in a position inside the apertures provided in the electrode A and in a position between the island electrodes of the electrode A, or in a position inside the apertures provided in the electrode A or in a position between the island electrodes of the electrode A.

The base electrode may be electrically connected to the lower-layer electrode through another contact hole. Electrically connecting the base electrode to the lower-layer electrode allows the base electrode to be electrically connected to at least one island electrode by the lower-layer electrode. Thereby, the base electrode and the island electrodes are not connected in the same plane but can be electrically connected by the lower-layer electrode. Thus, the same voltage can be applied to the base electrode and the island electrodes forming one first electrode.

The apertures provided in the base electrode may be arranged in a manner that the aperture area occupancy increases from the center of the base electrode toward the outer periphery thereof. The aperture area occupancy means the proportion of the total aperture area of the apertures in a predetermined unit area in one dimming unit. The apertures provided in the base electrode of the electrode A may be arranged in a manner that the aperture area occupancy increases from the center of the electrode A toward the center of the electrode B, and the apertures provided in the base electrode of the electrode B may be arranged in a manner that the aperture area occupancy increases from the center of the electrode B toward the center of the electrode A. For example, the apertures provided in the base electrode of the electrode A may be arranged in a manner that the aperture area increases from the center of the electrode A toward the center of the electrode B, and the apertures provided in the base electrode of the electrode B may be arranged in a manner that the aperture area increases from the center of the electrode B toward the center of the electrode A. Alternatively, the apertures provided in the base electrode of the electrode A may be arranged in a manner that the number of apertures increases from the center of the electrode A toward the center of the electrode B, and the apertures provided in the base electrode of the electrode B may be arranged in a manner that the number of apertures increases from the center of the electrode B toward the center of the electrode A.

The lower-layer electrode may overlap spaces between the apertures provided in the base electrode of one electrode and the island electrodes of the next electrode in a plan view. The lower-layer electrode may overlap a space between the electrode A and the electrode B along the boundary therebetween. For example, the lower-layer electrode may be formed in a cyclic shape so as to overlap a space between the two electrodes along the outer periphery formed by connecting outer apertures in the base electrode. Disposing the lower-layer electrode to overlap a space between the electrode A and the electrode B in a plan view can change the alignment of liquid crystal molecules in the boundary portion between the electrode A and the electrode B and thereby can restrict the occurrence of a dark line.

The outer peripheral shape of at least one aperture (the planar shape of the outer periphery in a plan view) may be a quadrangle. The outer peripheral shape of at least one aperture may be any shape as long as at least one island electrode can be disposed inside the aperture. The outer peripheral shape of at least one aperture provided in the base electrode may be a rectangular shape and may be, for example, a quadrangle such as a rectangle, a square, or a rhombus. When the planar shape of at least one island electrode is a quadrangle, the outer peripheral shape of at least one aperture for having the island electrode(s) inside is also preferably a quadrangle in order to reduce the gap between adjacent first electrodes. A loss of the aperture ratio can be reduced by disposing the island electrode(s) having a similar shape to the aperture(s) having the island electrode(s) inside.

An island electrode of the selected first electrode may be disposed inside an aperture in the next first electrode with a uniform peripheral space (gap). The uniform gap width can restrict uneven appearance of dark lines due to a gap difference. Furthermore, the loss of the aperture ratio can be minimized. The gap width may be, for example, 1 µm or greater and 20 µm or smaller.

At least one aperture may have an outer peripheral shape including a linear portion that forms an angle of −30° to +300 with respect to the extending direction of the linear electrodes of the second electrode, provided that in a view from the second substrate end, an angle formed in the clockwise direction is defined to be a negative angle and an angle formed in the counterclockwise direction is defined to be a positive angle. When at least one of the island electrodes is disposed inside at least one of the apertures provided in the base electrode of a next first electrode, setting the angle formed by the linear portion and the extending direction of the linear electrodes (hereinafter, also referred to as angle θz) to −30° to +300 increases the distance between adjacent regions with an alignment defect and thus allows dark lines to be less recognizable. In contrast, an angle θz of smaller than −30° or greater than +30° reduces the distance between adjacent regions with an alignment defect and may cause dark lines to be recognizable. The angle θz is more preferably −15° to +15°. The outer periphery of the aperture includes at least one linear portion described above, and may include multiple linear portions. At least one of the linear portions preferably forms an angle of −30° to +30°, more preferably an angle of −15° to +15°, with the extending direction of the linear electrodes. Preferably, a larger number of linear portions form an angle of −30° to +30°, more preferably an angle of −15° to +15°, with the extending direction of the linear electrodes.

The image-providing liquid crystal panel, whose structure will be described later, preferably includes multiple pixels that are each provided with sub-pixels of multiple colors and are arranged in a matrix in a plane. The dimming units constituting the dimming panel may be larger than the pixels constituting the image-providing liquid crystal panel. One dimming unit can dim multiple pixels.

The island electrodes may include an overlapping electrode portion that overlaps sub-pixels of all colors included in one pixel. The overlapping electrode portion is an electrode portion overlapping a pixel in a plan view. When a pixel includes a red sub-pixel, a green sub-pixel, and a blue sub-pixel, the overlapping electrode portion overlaps three sub-pixels of all colors including red, green, and blue. The overlapping electrode portion may have any structure as long as it overlaps sub-pixels of all colors in a plan view. For example, one island electrode may be provided for one pixel or for two or more adjacent pixels. Multiple island electrodes may be provided for one pixel or for two or more adjacent pixels. At least part of one island electrode may overlap sub-pixels of all colors, or multiple island electrodes may be provided for sub-pixels of the respective colors.

In the overlapping electrode portions, the difference between the maximum value and the minimum value among electrode areas overlapping the respective sub-pixels of the respective colors may be 30% or less of the maximum value. For example, the overlapping electrode portion is disposed such that the difference between the maximum value and the minimum value among the electrode area overlapping a red sub-pixel, the electrode area overlapping a green sub-pixel, and the electrode area overlapping a blue sub-pixel is 30% or less of the maximum value. This structure can restrict the occurrence of color deviation that causes a desired color to be differently recognized due to unbalanced amounts of light transmitted through sub-pixels of the respective colors in one pixel. The difference between the maximum value and the minimum value among the electrode areas overlapping the respective sub-pixels of the respective colors is more preferably 10% or less, still more preferably 5% or less, of the maximum value. In a structure where the island electrodes are arranged in a manner that the electrode area decreases toward the outer periphery of the first electrode and the sub-pixels of multiple colors are arranged along a first direction, adjusting the electrode widths of the island electrodes in a second direction that is perpendicular to the first direction allows the island electrodes to be arranged in a manner that the electrode area decreases toward the outer periphery of the first electrode and allows the difference between the maximum value and the minimum value among the electrode areas overlapping the respective sub-pixels of the multiple colors to be 30% or less of the maximum value.

The apertures may include an overlapping aperture portion that overlaps sub-pixels of all colors included in one pixel. The overlapping aperture portion is an aperture portion overlapping a pixel in a plan view. When a pixel includes a red sub-pixel, a green sub-pixel, and a blue sub-pixel, the overlapping aperture portion overlaps three sub-pixels of all colors including red, green, and blue. The overlapping aperture portion may have any structure as long as it overlaps sub-pixels of all colors in a plan view. For example, one aperture may be provided for two or more adjacent pixels, or multiple apertures may be provided for two or more pixels. The apertures may be arranged in a manner that at least part of one aperture overlaps sub-pixels of all colors.

In the overlapping aperture portions, the difference between the maximum value and the minimum value among aperture areas overlapping the respective sub-pixels of the respective colors may be 30% or less of the maximum value. This structure can restrict the occurrence of color deviation. The difference between the maximum value and the minimum value among the aperture areas overlapping the respective sub-pixels of the respective colors is more preferably 10% or less, still more preferably 5% or less, of the maximum value. When the apertures are arranged in a manner that the aperture area increases toward the outer periphery of the first electrode, adjusting the aperture widths of the respective apertures in the second direction allows the apertures to be arranged in a manner that the aperture area increases toward the outer periphery of the first electrode and allows the difference between the maximum value and the minimum value among the aperture areas overlapping sub-pixels of the multiple colors to be 30% or less of the maximum value.

In the dimming panel included in the unit, boundaries between adjacent dimming units tend to be less recognizable because the luminance distribution is smoothly changed and the occurrence of dark lines on the boundaries between dimming units can be restricted. Thus, the dimming panel can be also suitably used as an anti-glare panel that controls the amount of transmitting light. The anti-glare panel can be used as a vehicle-mounted sun visor for vehicles such as automobiles and railway wagons. The dimming panel has excellent viewing angle characteristics and high transmittance, and thus can be disposed between an image-providing liquid crystal panel and a backlight and can be used as a member of a liquid crystal display device.

<Liquid Crystal Display Device>

A liquid crystal display device according to an embodiment of the present invention includes: an image-providing liquid crystal panel; a backlight; and a dimming unit between the image-providing liquid crystal panel and the backlight, the dimming unit including: a dimming panel; and drive circuitry, the dimming panel sequentially including a first substrate, a liquid crystal layer, and a second substrate, the first substrate sequentially including an insulating substrate, a lower-layer electrode, a first insulating layer, multiple first electrodes, a second insulating layer, and a second electrode which is provided with multiple parallel linear electrodes and to which a constant voltage is applied, the first electrodes including multiple island electrodes which are spaced from each other in a plan view and are electrically connected to each other, at least one of the island electrodes being electrically connected to the lower-layer electrode through a contact hole, the drive circuitry controlling voltages applied to the respective first electrodes.

The liquid crystal display device of the embodiment includes an image-providing liquid crystal panel, a backlight, a dimming panel between the image-providing liquid crystal panel and the backlight, and drive circuitry. Disposing a dimming panel between the image-providing liquid crystal panel and the backlight can improve the contrast ratio of the liquid crystal display device. The liquid crystal display device of the embodiment can smooth the change in gray scale distribution between adjacent dimming units as described later. Furthermore, the amount of backlight illumination transmitted can be controlled in smaller areas than by local dimming with the backlight, and thus occurrence of a halo phenomenon can be restricted.

The image-providing liquid crystal panel may be any liquid crystal panel, and an example thereof is a liquid crystal panel sequentially including an active matrix substrate, a liquid crystal layer, and a color filter substrate. The image-providing liquid crystal panel may be a horizontally aligned liquid crystal panel such as a fringe field switching (FFS) liquid crystal panel or an in-plane switching (IPS) liquid crystal panel in terms of excellent viewing angle characteristics.

The active matrix substrate includes, for example, on an insulating substrate, parallel gate lines and parallel source lines extending in a direction crossing the gate lines with an insulating film in between, and, as switching elements, thin film transistors (TFTs) at the intersections of the gate lines and the source lines. A region surrounded by two adjacent gate lines and two adjacent source lines is herein referred to as a sub-pixel. The active matrix substrate includes multiple sub-pixel electrodes provided for the respective sub-pixels and each connected to the corresponding TFT via the corresponding drain electrode. In a horizontally aligned liquid crystal panel, the active matrix substrate further includes a common electrode stacked above the sub-pixel electrodes with an insulating layer in between.

The liquid crystal layer contains liquid crystal molecules. The liquid crystal molecules may have a positive anisotropy of dielectric constant (As) (positive type) or a negative anisotropy of dielectric constant (negative type) defined by the following formula.

$$\Delta\varepsilon=(\text{dielectric constant in major axis direction of liquid crystal molecules})-(\text{dielectric constant in minor axis direction of liquid crystal molecules}) \quad (L)$$

The color filter substrate includes, for example, on an insulating substrate, color filters of multiple colors and a black matrix partitioning the color filters of the respective colors in a plan view. The color filters of multiple colors may include red color filters, green color filters, and blue color filters. The color filters of multiple colors overlap the sub-pixels in a plan view.

The image-providing liquid crystal panel preferably includes multiple pixels that are each provided with sub-pixels of multiple colors and are arranged in a matrix in a plane. The sub-pixels of multiple colors mean sub-pixels overlapping the color filters of multiple colors. In color filters of multiple colors including red color filters, green color filters, and blue color filters, for example, a sub-pixel overlapping a red color filter is also referred to as a red sub-pixel, a sub-pixel overlapping a green color filter is also referred to as a green sub-pixel, and a sub-pixel overlapping a blue color filter is also referred to as a blue sub-pixel.

The image-providing liquid crystal panel may be sandwiched by a pair of polarizers. The polarizers may be linear polarizers and may be arranged with their absorption axes being perpendicular to each other, for example.

The backlight may be any backlight conventionally known in the field of liquid crystal display devices, and examples thereof include edge backlights and direct backlights. Driving a direct backlight by local dimming allows the liquid crystal display device to attain an effect of further improving the contrast ratio.

Hereinafter, the present invention is specifically described with reference to examples and drawings. The examples, however, are not intended to limit the present invention.

Example 1

FIG. 1 is an exploded perspective view of a liquid crystal display device of Example 1. As shown in FIG. 1, the liquid crystal display device of Example 1 includes an image-providing liquid crystal panel 1, a backlight 3, a dimming panel 2 between the image-providing liquid crystal panel 1 and the backlight 3, and drive circuitry 50. A pair of polarizers may be disposed on the surfaces of the image-providing liquid crystal panel 1 and on the surfaces of the dimming panel 2. As shown in FIG. 1, a first polarizer 4, the image-providing liquid crystal panel 1, a second polarizer 5, the dimming panel 2, and a third polarizer 6 may be disposed in this order. The image-providing liquid crystal panel 1 and the dimming panel 2 may share the second polarizer 5 disposed therebetween. The first polarizer 4 and the second polarizer 5 are arranged with their absorption axes being perpendicular to each other. The second polarizer 5 and the third polarizer 6 are arranged with their absorption axes being perpendicular to each other. The first polarizer 4, the second polarizer 5, and the third polarizer 6 are each an absorptive linear polarizer. Between the third polarizer 6 and the backlight 3 may be disposed an optical sheet 7 for diffusing light emitted from the backlight, such as a diffuser.

The image-providing liquid crystal panel 1 may be an active matrix liquid crystal panel. The image-providing liquid crystal panel 1 may include, for example, red, green, and blue sub-pixels, and three sub-pixels of the three colors may constitute one pixel. Multiple pixels are arranged in a matrix in an in-plane direction of the image-providing liquid crystal panel 1. The backlight 3 may be any backlight conventionally known in the field of liquid crystal display devices, and is preferably a direct backlight because local dimming driving can provide an effect of further improving the contrast ratio.

Figure 2:
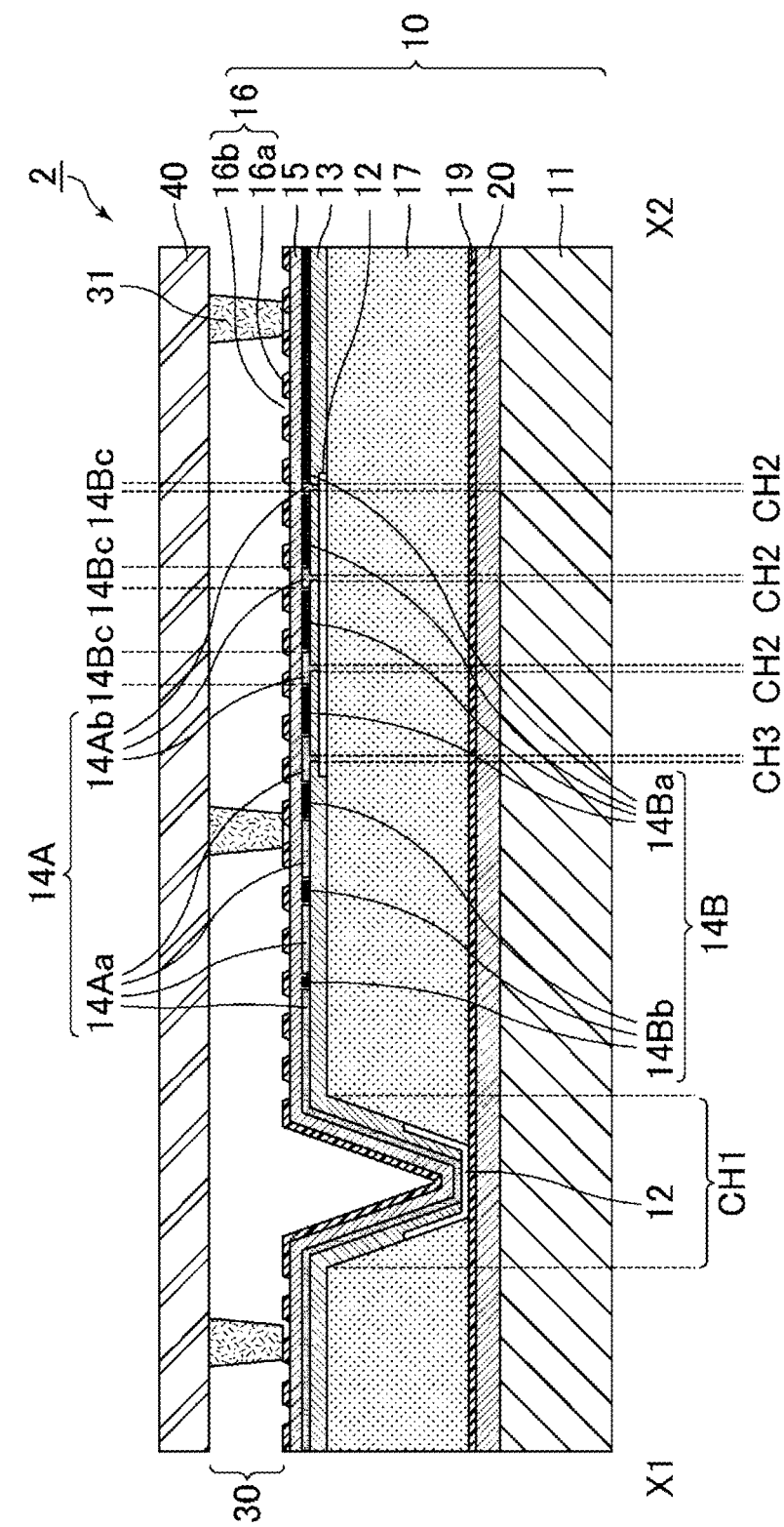
FIG. 2 is a schematic cross-sectional view showing a part of a dimming panel used in Example 1.
Figure 3:
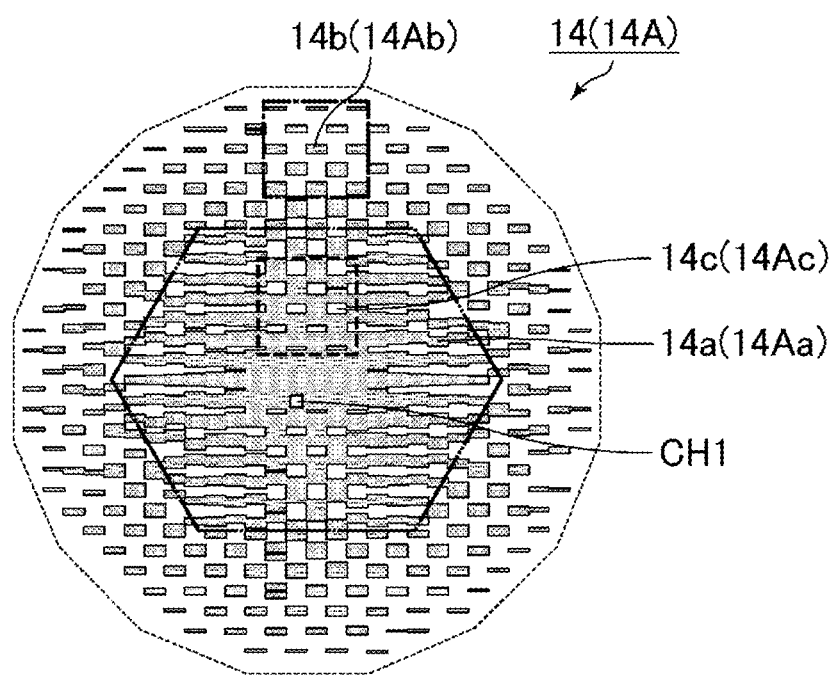
FIG. 3 is a schematic plan view showing one of first electrodes used in the dimming panel of Example 1.
Figure 4:
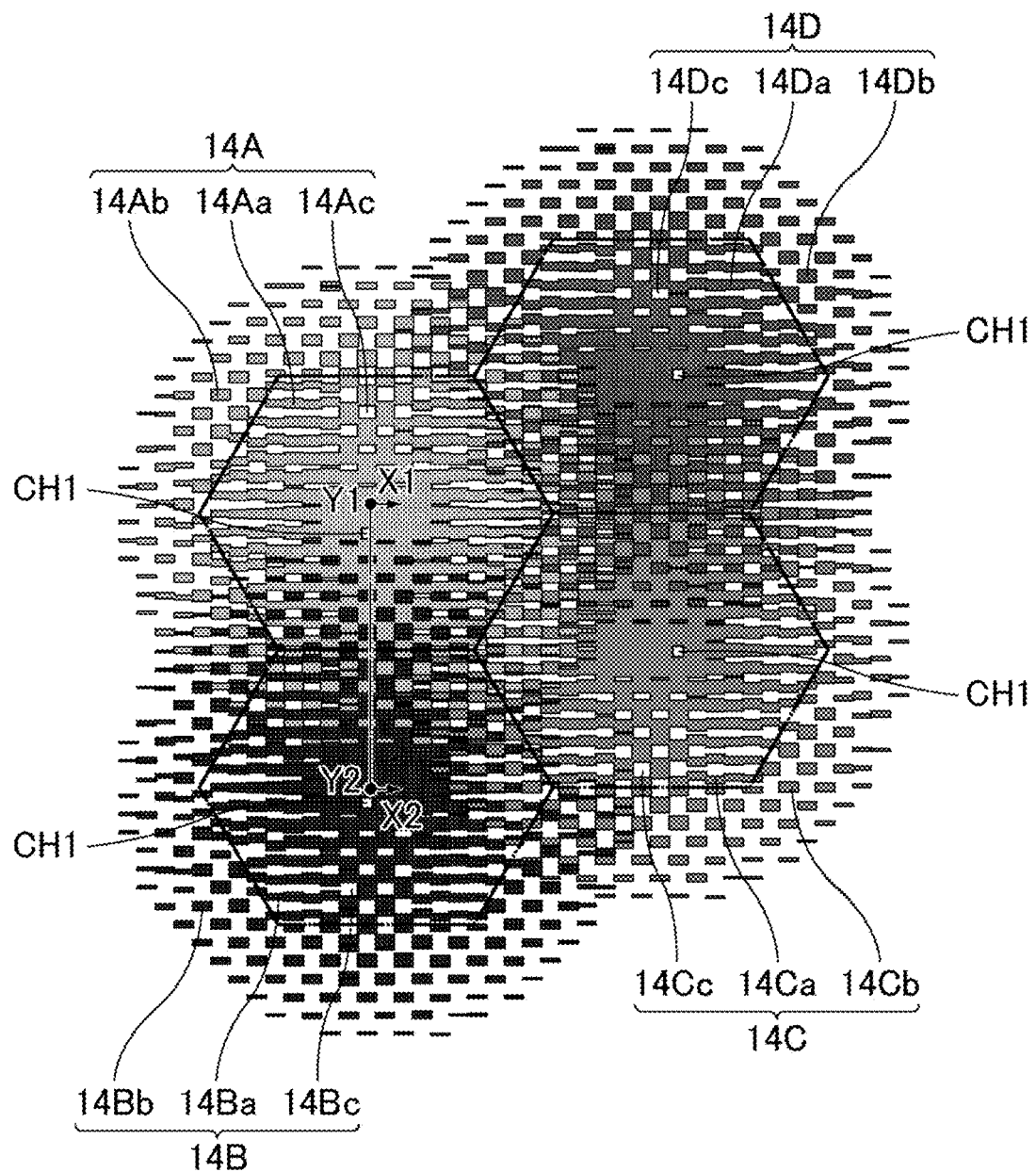
FIG. 4 is a schematic plan view showing a part of the dimming panel used in Example 1.

Hereinafter, the dimming panel used in Example 1 is described. FIG. 2 is a schematic cross-sectional view showing a part of the dimming panel used in Example 1. FIG. 3 is a schematic plan view showing one of first electrodes used in the dimming panel of Example 1. FIG. 4 is a schematic plan view showing a part of the dimming panel used in Example 1. FIG. 2 is a schematic cross-sectional view taken along the line X1-X2 in FIG. 4.

As shown in FIG. 2, the dimming panel 2 sequentially includes a first substrate 10, a liquid crystal layer 30, and a second substrate 40. The dimming panel 2 is a horizontally aligned dimming panel, and the first substrate 10 sequentially includes an insulating substrate 11, a lower-layer electrode 12, a first insulating layer 13, multiple first electrodes including 14A and 14B, a second insulating layer 15, and a second electrode 16. The first electrodes 14A and 14B and the second electrode 16 may each be formed of, for example, a transparent electrode material such as ITO or IZO. The first insulating layer 13 may be any layer that can insulate the lower-layer electrode 12 from the first electrodes 14A and 14B. The second insulating layer 15 may be any layer that can insulate the first electrodes 14A and 14B from the second electrode 16. The first insulating layer 13 and the second insulating layer 15 may be formed from a silicon oxide film, a silicon nitride film, or the like.

As shown in FIG. 2, island electrodes 14Ab are electrically connected to each other by the lower-layer electrodes 12 through contact holes CH2 penetrating the second insulating layer 15. A base electrode 14Aa is electrically connected to the lower-layer electrode 12 through a contact hole CH3 penetrating the second insulating layer 15. In other words, at least one island electrode 14Ab and the base electrode 14Aa are electrically connected by the lower-layer electrode 12. The first electrode 14A (in FIG. 2, the base electrode 14Aa) is electrically connected to one of multiple connection lines 19 disposed between the insulating substrate 11 and a third insulating layer 17 through a contact hole CH1 penetrating the second insulating layer 15 and the third insulating layer 17 on the insulating substrate 11 end. The liquid crystal display device of Example 1 includes drive circuitry that controls the voltages applied to the respective first electrodes 14. The first electrodes 14 are each connected to the drive circuitry via the corresponding connection line 19. In the contact hole CH1, the lower-layer electrode 12 may be disposed in a portion for connecting the first electrode 14A and the connection line 19. Between the insulating substrate 11 and the lower-layer electrode 12 may be disposed a fourth insulating layer 20. FIG. 2 shows a case where the base electrode 14Aa is electrically connected to the connection line 19 through the contact hole CH1. Alternatively, at least one island electrode may be electrically connected to the connection line 19 through the contact hole CH1.

Hereinafter, the structure of the first electrodes used in the dimming panel of Example 1 is described with reference to FIG. 3. As shown in FIG. 3, in one first electrode 14 (14A), multiple island electrodes 14b (14Ab) are arranged with intervals in a plan view. The island electrodes 14b are arranged in a manner that the electrode area concentrically decreases from the center of a base electrode 14a (14Aa) toward the outer periphery of the first electrode 14. In FIG. 3 and the later-described FIG. 4, the portions surrounded by two-dot chain lines indicate positioning areas for roughly locating the base electrodes 14a when the first electrodes 14 are arranged in a plane of the dimming panel. The outer peripheral shape of the positioning area may be different from the outer peripheral shape of the base electrode 14a. The base electrode 14a is provided with multiple apertures 14c (14Ac). The apertures 14c are arranged in a manner that the aperture area concentrically increases from the center of the base electrode 14a (14Aa) toward the outer periphery of the first electrode 14A. In Example 1, the planar shape of at least one island electrode 14b is a quadrangle, and the outer peripheral shape of at least one aperture 14c is also a quadrangle.

The outer peripheral shape of the positioning area is preferably a shape that allows tidy arrangement of a plurality of the shapes on a flat surface. The outer peripheral shape of the positioning area may be a shape such as a triangle, a quadrangle, or a hexagon. Examples of the triangle include equilateral triangles, isosceles triangles, and right triangles. Examples of the quadrangle include squares, rectangles, and rhombuses. In order to achieve a smoother change in luminance distribution, the outer peripheral shape of the positioning area is preferably a regular polygon, and an equilateral triangle, a square, a regular hexagon, or the like is suitable.

In Example 1, the outer peripheral shape of the positioning area is a hexagon. Thus, one first electrode 14A is adjacent to six other first electrodes with its six sides as boundaries. The arrangement of three first electrodes 14B, 14C, and 14D among the six first electrodes adjacent to the first electrode 14A is described with reference to FIG. 4. As shown in FIG. 4, the first electrodes 14B, 14C, and 14D respectively include the base electrodes 14Ba, 14Ca, and 14Da and multiple island electrodes 14Bb, 14Cb, and 14Db respectively surrounding the base electrodes 14Ba, 14Ca, and 14Da in a plan view. The base electrodes 14Ba, 14Ca, and 14Da are respectively provided with multiple apertures 14Bc, 14Cc, and 14Dc.

Here, two adjacent first electrodes 14A and 14B are focused on. As shown in FIG. 2 and FIG. 4, at least one island electrode 14Ab of the first electrode 14A is disposed in at least one position selected from the group consisting of a position inside at least one aperture 14Bc in the base electrode 14Ba and a position between adjacent two of the island electrodes 14Bb of the first electrode 14B. Also, at least one island electrode 14Bb of the first electrode 14B is disposed in at least one position selected from the group consisting of a position inside at least one aperture 14Ac in the base electrode 14Aa and a position between adjacent two of the island electrodes 14Ab of the first electrode 14A.

Figure 5A:
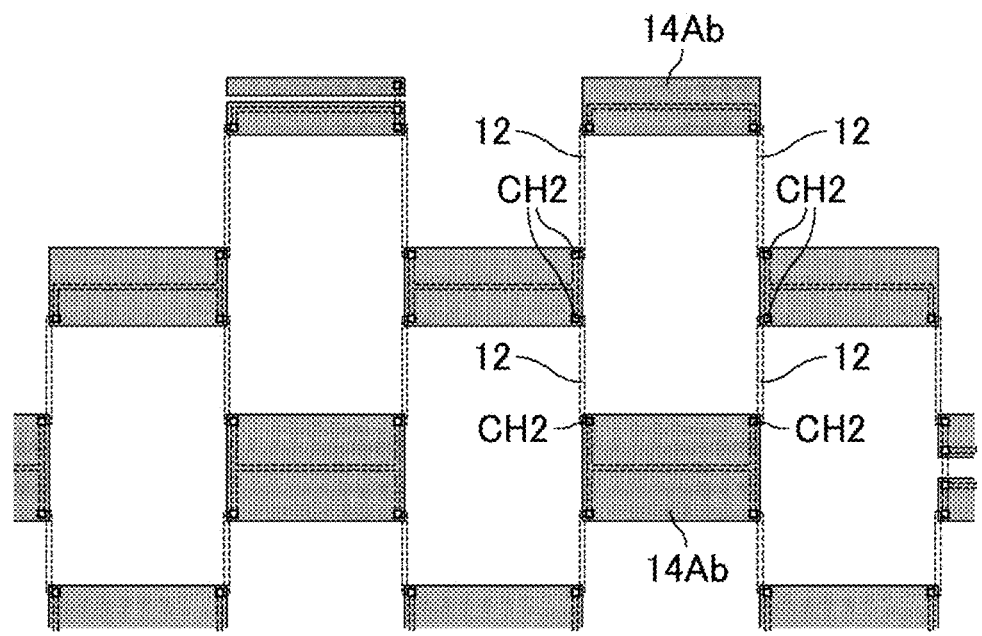
FIG. 5A is a partially enlarged schematic plan view showing an example of island electrodes shown in FIG. 3.
Figure 5B:
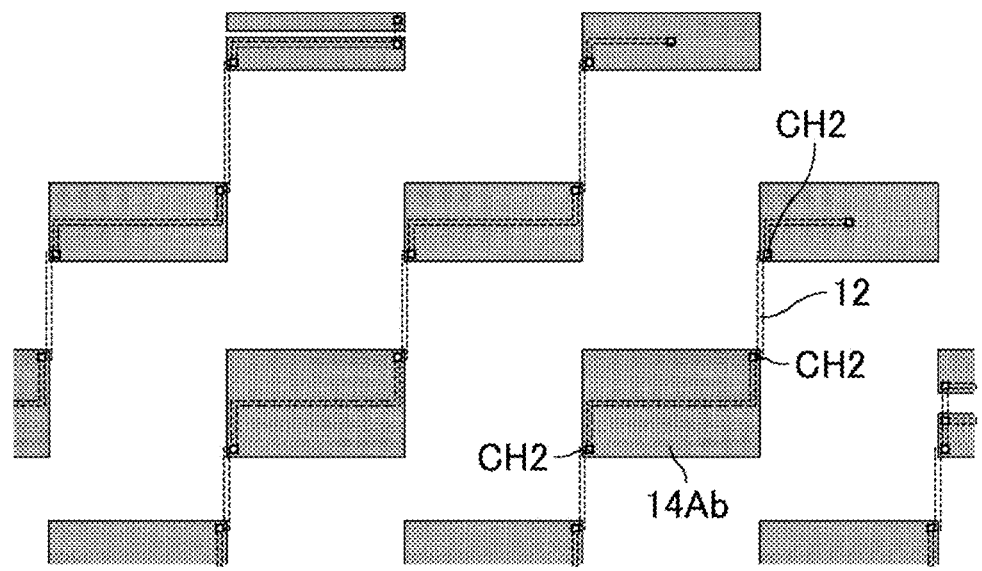
FIG. 5B is a partially enlarged schematic plan view showing another example of island electrodes shown in FIG. 3.

FIG. 5A is a partially enlarged schematic plan view showing an example of the island electrodes shown in FIG. 3. FIG. 5B is a partially enlarged schematic plan view showing another example of the island electrodes shown in FIG. 3. FIG. 5A and FIG. 5B are each a partially enlarged schematic plan view showing a part of the island electrodes surrounded by a one-dot chain line in FIG. 3. In FIG. 5A and FIG. 5B, the lower-layer electrodes 12 disposed in a layer below the island electrodes 14Ab are shown by dotted lines, and contact holes CH2 connecting the island electrodes 14Ab and the lower-layer electrodes 12 are shown by white squares. The lower-layer electrode 12 may overlap the boundaries of the pixels 9 constituting the image-providing liquid crystal panel 1. For example, the island electrodes 14Ab may be connected in the line direction and column direction by the lower-layer electrode 12 disposed in a mesh pattern that overlaps the boundaries between the pixels as shown in FIG. 5A, or may be connected in a diagonal direction by the lower-layer electrode 12 that is disposed in the diagonal direction and overlaps the boundaries between the pixels as shown in FIG. 5B.

Figure 6:
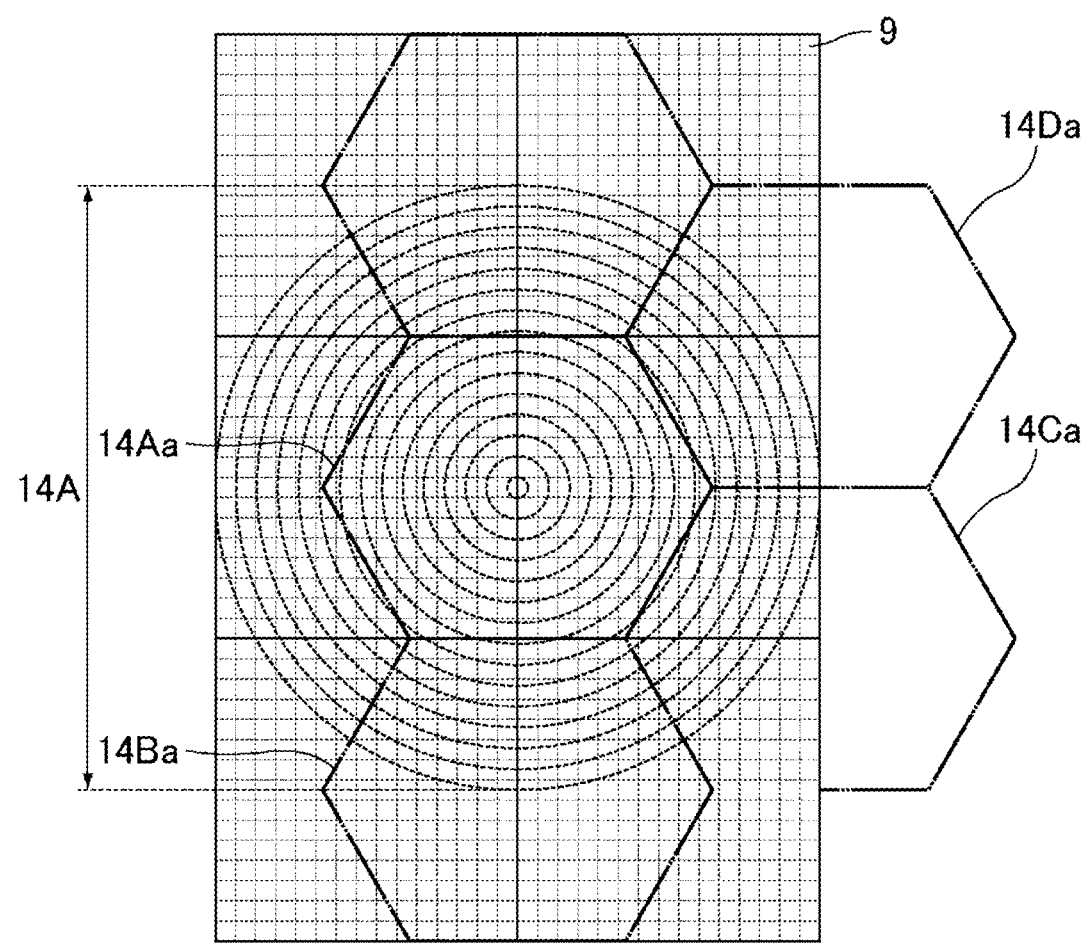
FIG. 6 is a plan view showing an arrangement example of first electrodes with reference to pixels of an image-providing liquid crystal panel.

Hereinafter, a method for arranging the first electrodes 14 is described with reference to FIG. 6. FIG. 6 is a plan view showing an arrangement example of first electrodes with reference to pixels of an image-providing liquid crystal panel. In FIG. 6, the portions surrounded by two-dot chain lines are positioning areas for roughly locating the base electrodes 14a. The base electrodes 14a and the island electrodes 14b of the first electrodes 14 in the dimming panel 2 may be arranged with reference to the pixels of the image-providing liquid crystal panel. As shown in FIG. 6, multiple positioning areas are designed to be tidily arranged in a plane of the dimming panel. The base electrodes 14a are positioned with reference to the positioning areas. In FIG. 6, the outer peripheral shape of each positioning area is a hexagon. The base electrodes 14Aa, 14Ba, 14Ca, and 14 Da are positioned with reference to the hexagonal positioning areas tidily arranged in the plane. The island electrodes 14b may be concentrically arranged from the center of each first electrode 14.

Figure 7:
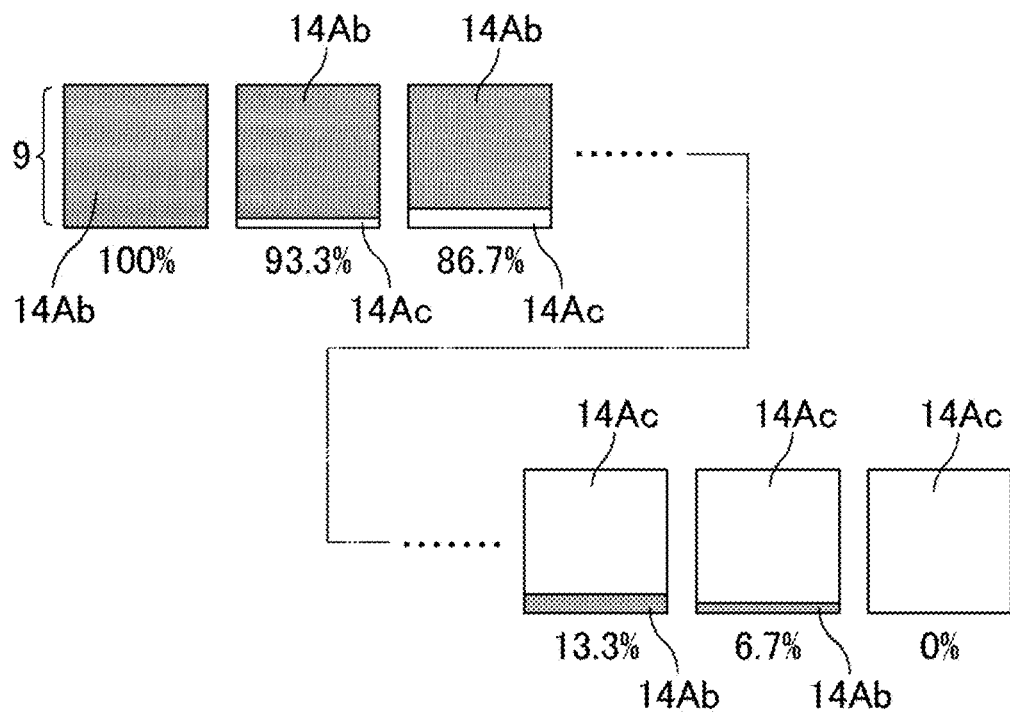
FIG. 7 is a schematic view for describing a manner for reducing the electrode area of the island electrodes in Example 1.

Hereinafter, the arrangement of the island electrodes is described with reference to FIG. 7 to FIG. 9. FIG. 7 is a schematic view for describing a manner for reducing the electrode area of the island electrodes in Example 1. As shown in FIG. 7, the areas of the island electrodes 14Ab overlapping pixels 9 of the image-providing liquid crystal panel are set in 16 grades, for example. Provided that the electrode area of an electrode portion overlapping the entire surface of one pixel 9 is defined as 100%, the areas of electrode portions overlapping the respective pixels 9 (overlapping electrode portions) gradually decrease, such as 93.3%, 86.7%, and go on, from the center of the first electrode 14A toward the outer periphery of the first electrode 14A.

Figure 8:
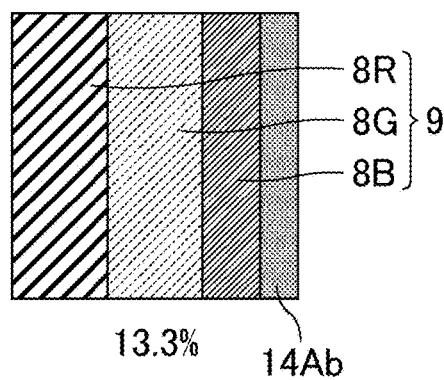
FIG. 8 is a schematic plan view showing an example of disposing an overlapping electrode portion with reference to one pixel in Example 1.

FIG. 8 is a schematic plan view showing an example of disposing an overlapping electrode portion with reference to one pixel in Example 1. FIG. 9 is a schematic plan view showing a preferred example of disposing an overlapping electrode portion with reference to one pixel in Example 1. FIG. 8 and FIG. 9 each show a case where the electrode area of an island electrode overlapping one pixel 9 (overlapping electrode portion) is 13.3%. The overlapping electrode portions are preferably disposed in a manner that no color deviation is caused when the dimming panel 2 is stacked above the image-providing liquid crystal panel 1. As shown in FIG. 8, the pixel 9 includes a red sub-pixel 8R, a green sub-pixel 8G, and a blue sub-pixel 8B. Here, when the island electrode 14Ab (overlapping electrode portion) overlaps the blue sub-pixel 8B only, for example, the amount of light transmitted through the blue sub-pixel 8B is smaller than the amount of light transmitted through the red sub-pixel 8R and the green sub-pixel 8G, which may result in color deviation causing a failure in providing a desired color. Accordingly, the overlapping electrode portion preferably overlaps all of the red sub-pixel 8R, the green sub-pixel 8G, and the blue sub-pixel 8B included in the pixel 9 as shown in FIG. 9. More preferably, the difference between the maximum value and the minimum value among the electrode areas overlapping the respective sub-pixels of the respective colors is 30% or less of the maximum value.

Provided that the red sub-pixel 8R, the green sub-pixel 8G, and the blue sub-pixel 8B are aligned in a direction D1, adjusting the electrode width in a direction D2 that is perpendicular to the direction D1 allows the difference between the maximum value and the minimum value among the electrode areas overlapping the red sub-pixel 8R, the green sub-pixel 8G, and the blue sub-pixel 8B to be 30% or less of the maximum value and allows control of the electrode areas toward the outer periphery of first electrode 14A.

Figure 9:
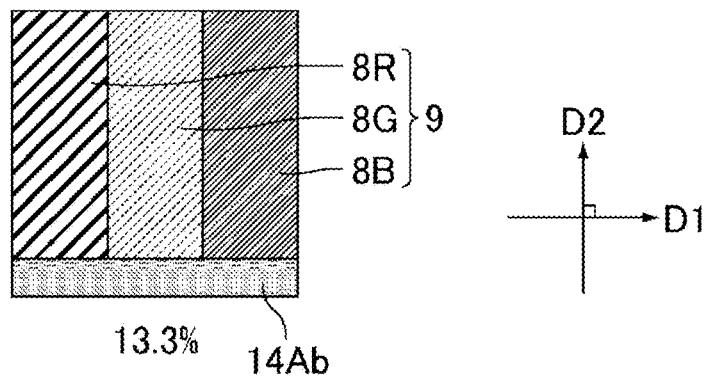
FIG. 9 is a schematic plan view showing a preferred example of disposing an overlapping electrode portion with reference to one pixel in Example 1.

FIG. 9 describes the structure where one island electrode is disposed for one pixel. Still, one island electrode 14Ab may be disposed for one pixel, or one island electrode 14Ab may be disposed for two pixels adjacent in the D2 direction. As described later, in order to allow dark lines to be less recognizable when one aperture 14Ac is provided for two pixels adjacent in the D2 direction, one island electrode 14Ab is preferably disposed for two pixels adjacent in the D2 direction.

Figure 10:
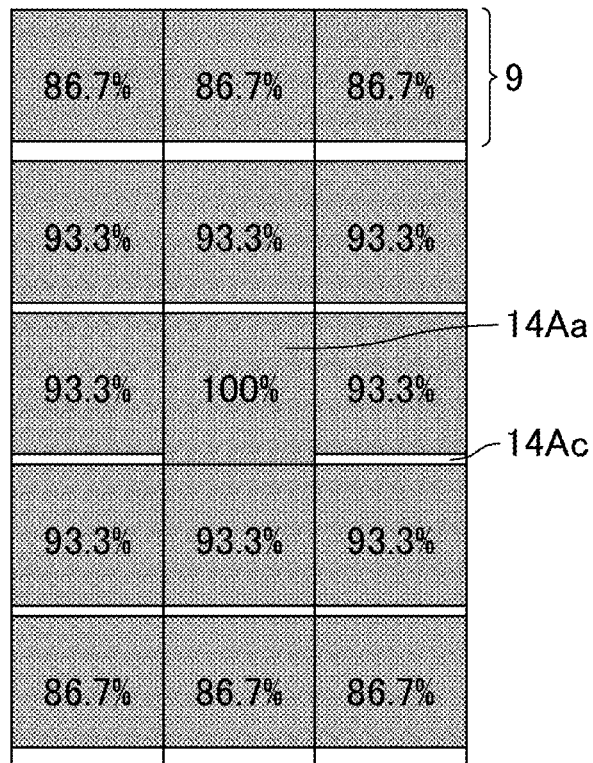
FIG. 10 is a schematic plan view showing an example of disposing an overlapping aperture portion for each pixel in Example 1.
Figure 11:
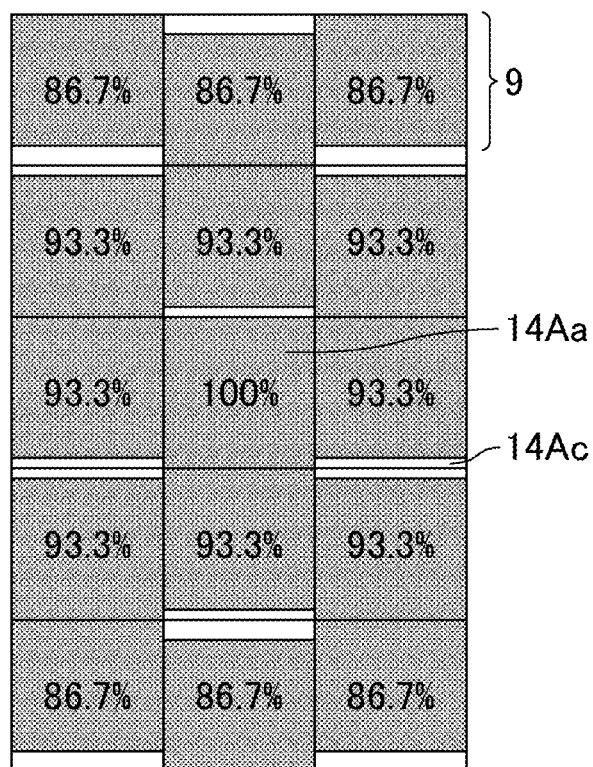
FIG. 11 is a schematic plan view showing a preferred example of disposing an overlapping aperture portion for each pixel in Example 1.

Hereinafter, the arrangement of multiple overlapping aperture portions provided in the base electrodes is described with reference to FIG. 10 and FIG. 11. FIG. 10 is a schematic plan view showing an example of disposing an overlapping aperture portion for each pixel in Example 1. FIG. 11 is a schematic plan view showing a preferred example of disposing an overlapping aperture portion for each pixel in Example 1. FIG. 10 and FIG. 11 are each a partially enlarged schematic plan view showing a part surrounded by a dotted line of the base electrode in FIG. 3. The numbers (%) shown in FIG. 10 and FIG. 11 each indicate the proportion of the electrode area overlapping one pixel 9

(overlapping electrode portion) relative to the area of the pixel 9 defined as 100%. The proportion of the area of an aperture overlapping the pixel 9 (overlapping aperture portion) may be appropriately set in consideration of the width (gap width) between two adjacent first electrodes. Accordingly, as the electrode area overlapping one pixel 9 decreases from the center of the base electrode toward the outer periphery, the aperture area overlapping the corresponding pixel 9 increases. As shown in FIG. 9, when one pixel 9 includes a red sub-pixel 8R, a green sub-pixel 8G, and a blue sub-pixel 8B, the overlapping aperture portion preferably overlaps all of the red sub-pixel 8R, the green sub-pixel 8G, and the blue sub-pixel 8B similarly to the above-mentioned case of the overlapping electrode portion. The difference between the maximum value and the minimum value among the aperture areas overlapping the respective sub-pixels of the respective colors is preferably 30% or less of the maximum value.

Although not shown in FIG. 10 and FIG. 11, in the aperture 14Ac may be disposed the island electrode 14Bb of the next first electrode 14B, for example. In the boundary portion between the first electrode 14A and the first electrode 14B, a dark line tends to appear due to an alignment defect of liquid crystal molecules. Thus, when multiple overlapping aperture portions (apertures 14Ac) are aligned in the line direction of the pixels 9 as shown in FIG. 10, dark lines tend to be recognized along the line direction. In contrast, as shown in FIG. 11, when one aperture 14Ac is disposed for two pixels adjacent in the D2 direction and the overlapping aperture portions are scattered without being aligned in a specific direction, dark lines can be less recognizable. Collecting the apertures 14Ac or the island electrodes 14Bb as shown in FIG. 11 can reduce the number of apertures on the boundary portions between the first electrode 14A and the first electrode 14B and thereby can reduce portions that could cause dark lines due to an alignment defect of liquid crystal molecules.

Figure 12:
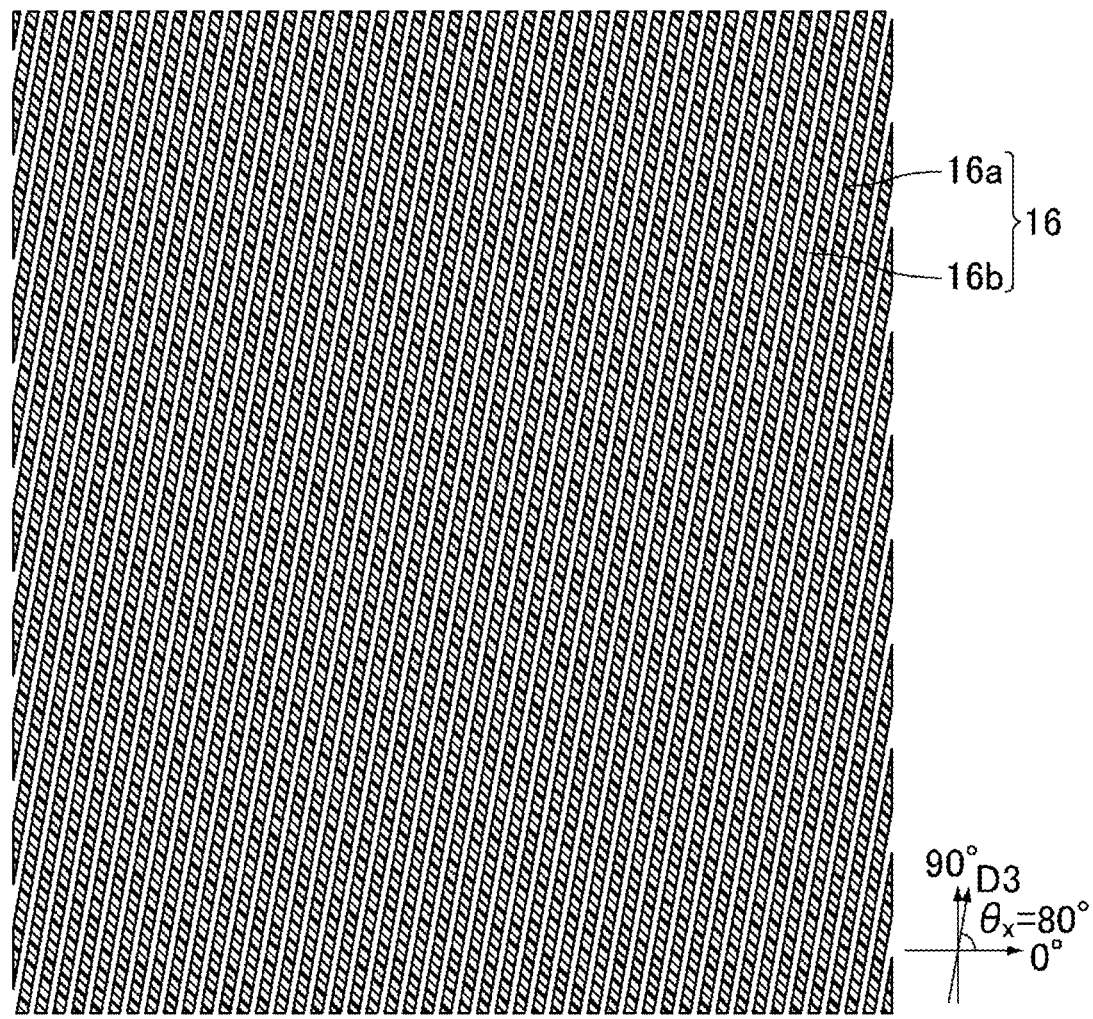
FIG. 12 is a schematic plan view of the second electrode shown in FIG. 2.

Hereinafter, the second electrode 16 is described with reference to FIG. 12. FIG. 12 is a schematic plan view of the second electrode shown in FIG. 2. As shown in FIG. 12, the second electrode 16 includes parallel linear electrodes 16a. Slits 16b are provided between the linear electrodes 16a. The second electrode 16 may be disposed on the dimming panel 2 entirely. Although not being shown, the linear electrodes 16a may be electrically connected to each other by, for example, an electrode connecting portion disposed at the terminals of the linear electrodes 16a. The second electrode 16 is connected to, for example, a common line disposed on the periphery of the dimming panel, and a constant voltage is applied thereto. In Example 1, an extending direction D3 of the linear electrodes 16a is set to be 80° in the counterclockwise direction with respect to the absorption axis of the first polarizer 4 or the absorption axis of the second polarizer 5 defined to be 0° in a view seen from the second substrate 40 end. In other words, an angle θx formed by the direction D3 and one of the absorption axis of the first polarizer 4 and the absorption axis of the second polarizer 5 is set to 80°.

As shown in FIG. 2, the liquid crystal layer 30 is sandwiched between the first substrate 10 and the second substrate 40 while having a predetermined thickness maintained with spacers 31. The liquid crystal layer 30 may contain liquid crystal molecules whose anisotropy of dielectric constant (Δs) has a positive value or a negative value. The insulating substrate 11 and the second substrate 40 are support substrates sandwiching the liquid crystal layer 30 and may each be an insulating substrate such as a glass plate or a plastic plate such as a polycarbonate plate. An alignment film defining the initial alignment azimuth of the liquid crystal molecules may be disposed between the first substrate 10 and the liquid crystal layer 30 and between the second substrate 40 and the liquid crystal layer 30.

Figure 13:
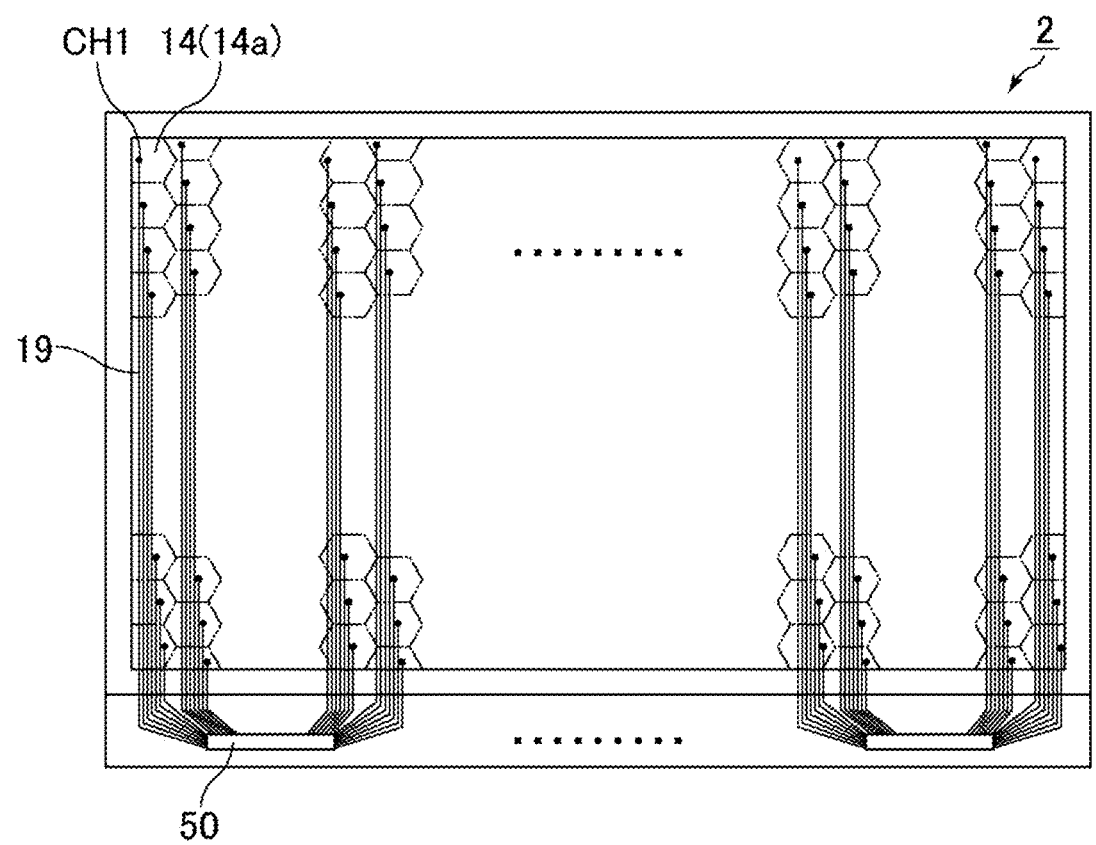
FIG. 13 is a schematic plan view of the dimming panel, showing an example of a method for driving the first electrodes in Example 1.

FIG. 13 is a schematic plan view of the dimming panel, showing an example of a method for driving the first electrodes in Example 1. In FIG. 13, positioning areas for locating the base electrodes 14a are shown by two-dot chain lines. As shown in FIG. 13, the outer peripheral shape of each positioning area is a hexagon, and the first electrodes 14 (base electrodes 14a) are arranged in the line direction and the column direction in a plane of the dimming panel 2. The first electrodes 14 may each be connected to drive circuitry 50 via the corresponding connection line 19. A driving method in which each of the first electrodes 14 is directly connected to the drive circuitry 50 is referred to as a segment mode. The connection lines 19 formed from a transparent electrode such as ITO can increase the transmittance of the dimming panel 2. As shown in FIG. 13, the first electrodes 14 arranged in the column direction may be arranged in a manner that the contact holes CH1 are shifted in the line direction. The drive circuitry 50 may be disposed in a frame region that is outside the dimming region where multiple dimming units are arranged.

Figure 14:
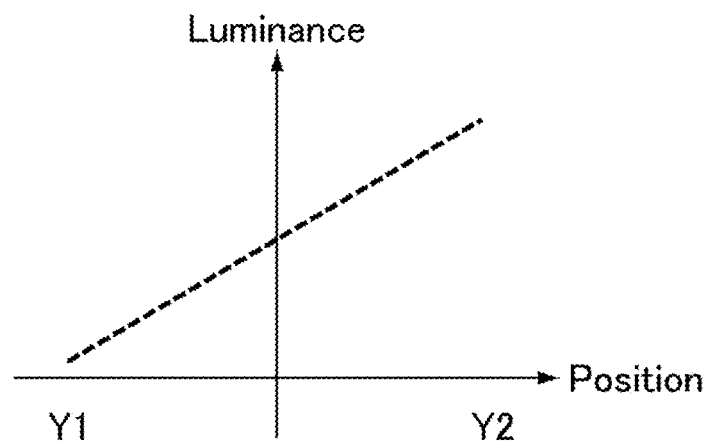
FIG. 14 is a schematic graph showing a change in luminance distribution of the dimming panel used in the liquid crystal display device of Example 1.

FIG. 14 is a schematic graph showing a change in luminance distribution of the dimming panel used in the liquid crystal display device of Example 1. FIG. 14 schematically shows the change in luminance between a center Y1 of the first electrode 14A and a center Y2 of the first electrode 14B shown in FIG. 4. FIG. 14 shows that the luminance smoothly changes between the adjacent first electrodes in Example 1.

As described above, in Example 1, one first electrode 14A is adjacent to six other first electrodes. Also, the first electrodes each include the island electrodes 14b electrically connected to each other by the lower-layer electrodes 12. As shown in FIG. 4, at least one island electrode 14Ab of the first electrode 14A is disposed inside at least one aperture in the base electrode of each of the six other first electrodes or between the island electrodes of each of the six other first electrodes. Also, at least one island electrode of each of the six other first electrodes is disposed inside at least one aperture 14c in the base electrode 14a of the first electrode 14A or between the island electrodes 14b of the first electrode 14A. In Example 1, the change in luminance distribution can be smoothed between one first electrode and the next first electrode in six directions. Thus, the boundaries between dimming units can be less recognizable than in the later-described cases where the outer peripheral shape of the positioning areas is a quadrangle. Meanwhile, the hexagonal outer peripheral shape of the positioning areas complicates the relation with the corresponding pixels constituting the image-providing liquid crystal panel.

Example 2

Figure 15:
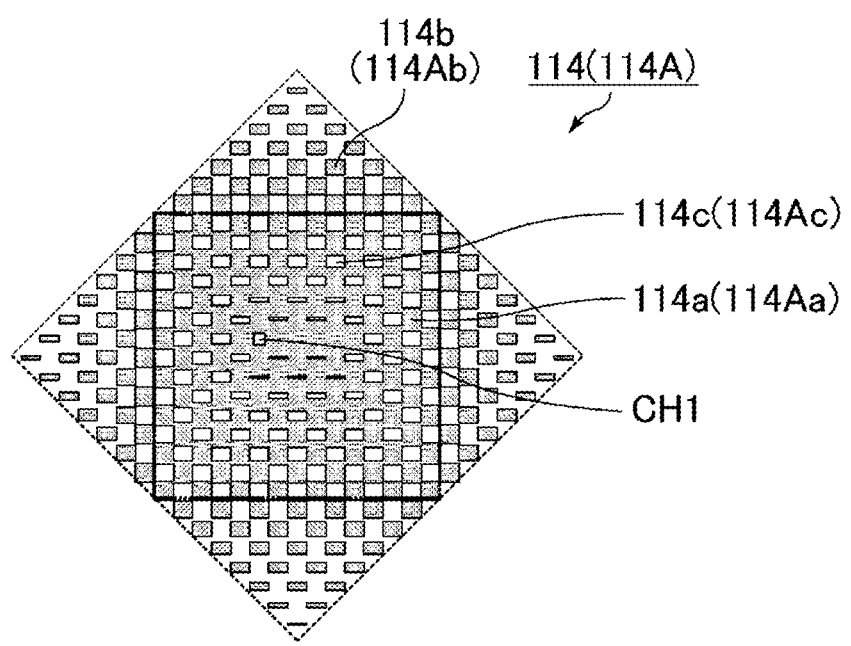
FIG. 15 is a schematic plan view showing one of first electrodes used in a dimming panel of Example 2.
Figure 16:
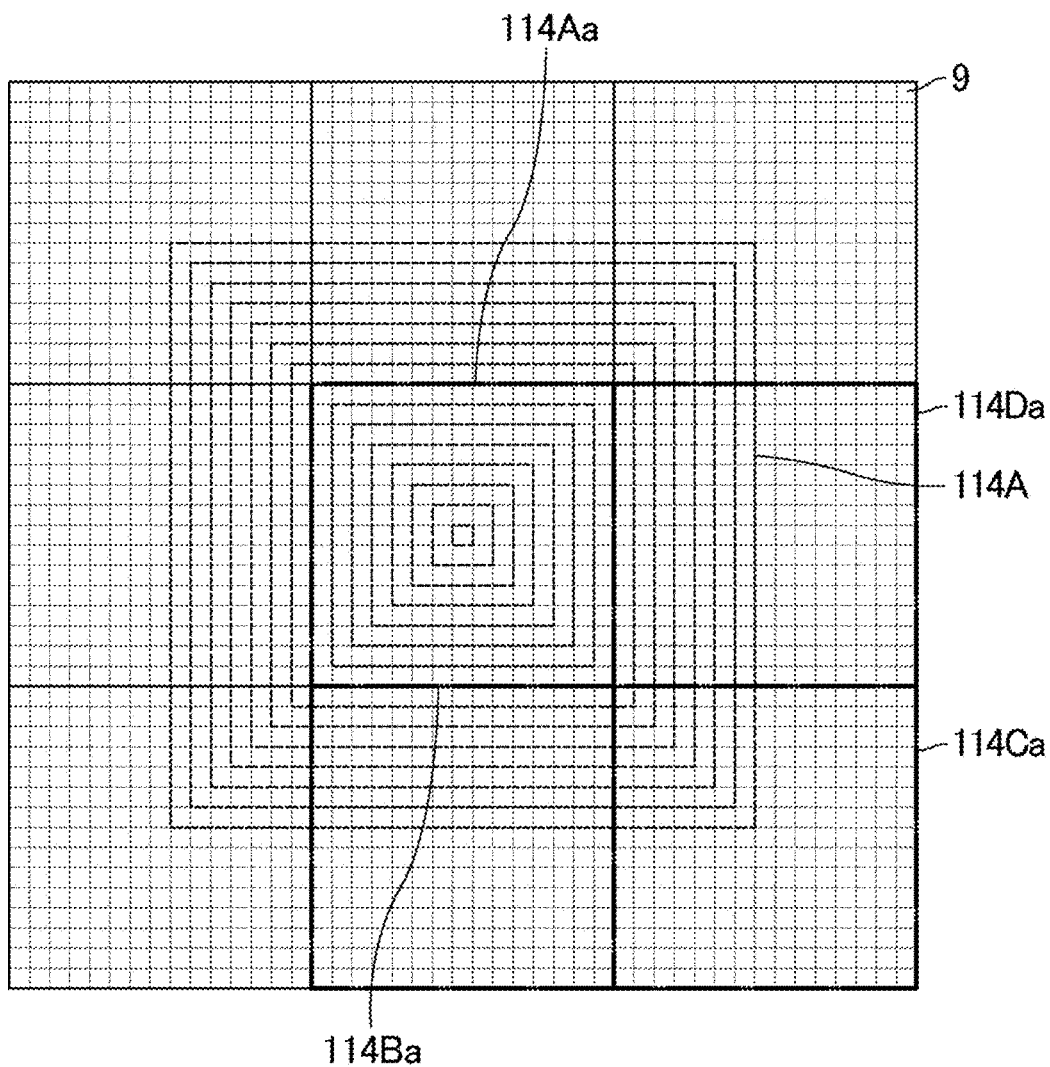
FIG. 16 is a plan view of first electrodes arranged with reference to the pixels of the image-providing liquid crystal panel.
Figure 17:
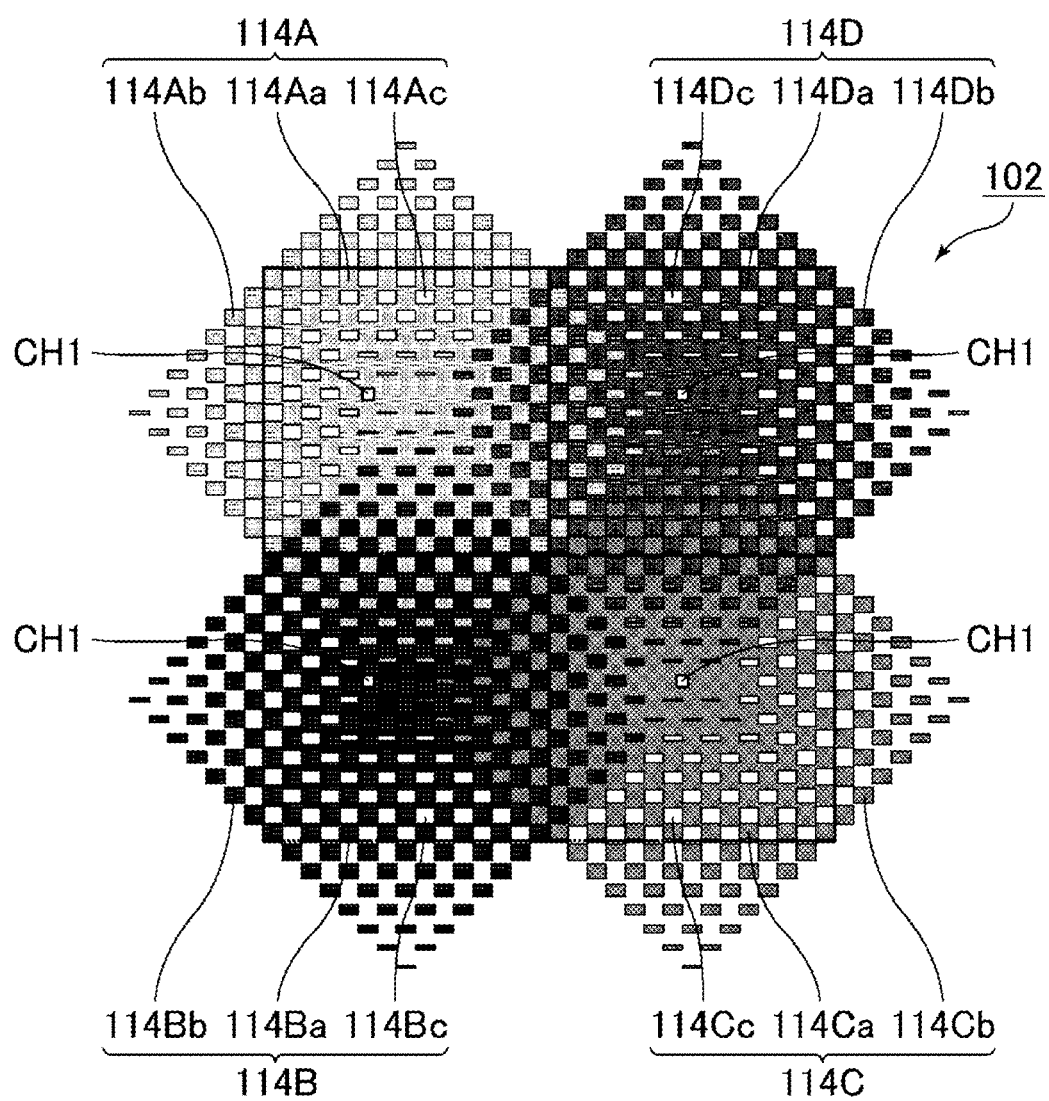
FIG. 17 is a schematic plan view showing an arrangement example of first electrodes shown in FIG. 15.
Figure 18:
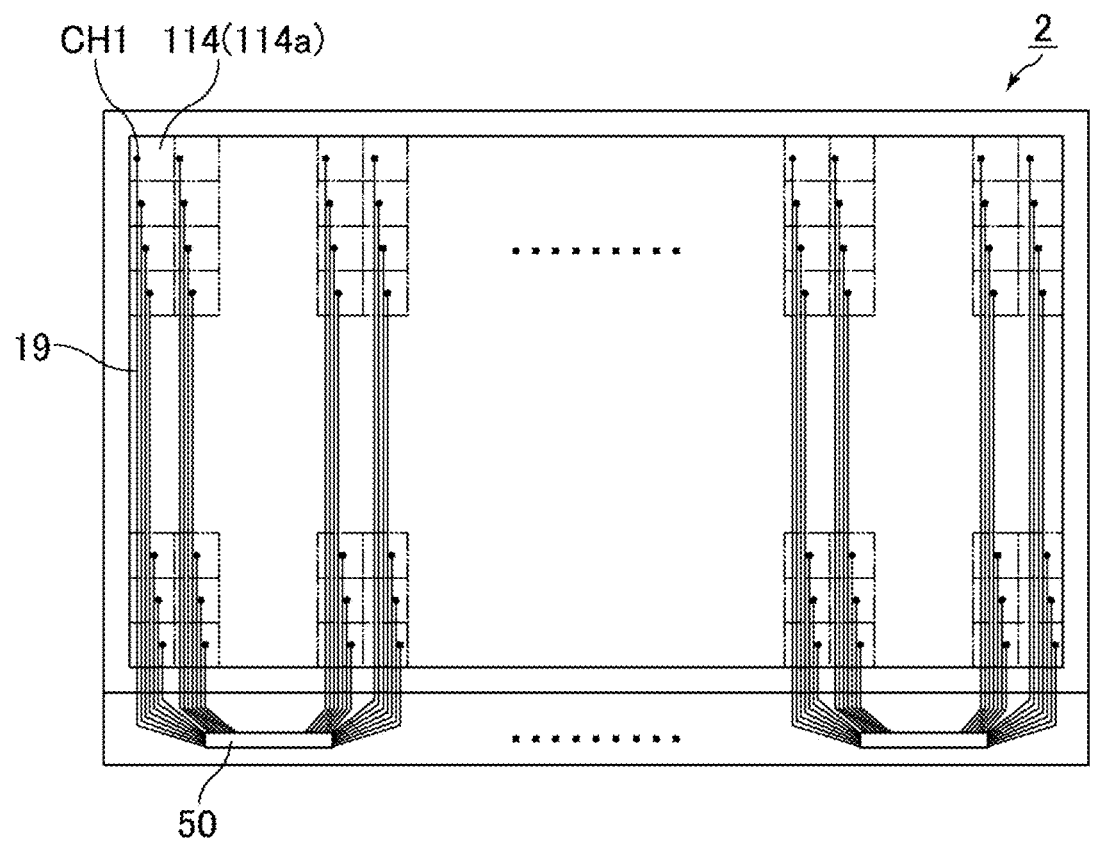
FIG. 18 is a schematic plan view of the dimming panel in Example 2, showing an example of a method for driving the first electrodes.

Hereinafter, a liquid crystal display device of Example 2 is described with reference to FIG. 15 to FIG. 18. The liquid crystal display device of Example 2 has the same structure as that of Example 1 except for the structure of the first electrodes used in the dimming panel. The description for the structures similar to the liquid crystal display device of Example 1 is omitted here. FIG. 15 is a schematic plan view showing one of first electrodes used in a dimming panel of Example 2. FIG. 16 is a plan view of the first electrodes arranged with reference to the pixels of the image-providing liquid crystal panel. FIG. 17 is a schematic plan view showing an arrangement example of first electrodes shown in FIG. 15. FIG. 18 is a schematic plan view of the dimming panel in Example 2, showing an example of a method for driving the first electrodes. In FIG. 15 and FIG. 17, the portions surrounded by two-dot chain lines are positioning areas for locating the first electrodes. In FIG. 18, positioning areas for locating base electrodes 114a are indicated by two-dot chain lines.

As shown in FIG. 15, the outer peripheral shape of the positioning areas for locating the first electrodes in Example 2 is a quadrangle (square). Each base electrode 114a is provided with multiple apertures 114c (114Ac). Multiple island electrodes 114b (114Ab) surround the base electrode 114a in a plan view. The island electrodes 114b are arranged in a manner that the electrode area decreases from the center of the base electrode 114a toward the outer periphery of the first electrode 114. The apertures 114c are arranged in a manner that the aperture area increases from the center of the base electrode 114a toward the outer periphery of the first electrode 114. In Example 2, the planar shape of at least one island electrode 114b is a quadrangle, and the outer peripheral shape of at least one aperture 114c is also a quadrangle.

As shown in FIG. 16, base electrodes 114Aa, 114Ba, 114Ca, and 114Da are tidily arranged on a flat surface. The island electrodes 114Ab are arranged to form concentric squares from the center of the base electrode 114Aa toward the outer periphery of the first electrode 114A.

In Example 2, the outer peripheral shape of the positioning areas is a quadrangle. Thus, one first electrode 114A is adjacent to four other first electrodes with its four sides as boundaries. The arrangement of two first electrodes 114B and 114D among the four other first electrodes adjacent to the first electrode 114A and the first electrode 114C diagonal to the first electrode 114A is described with reference to FIG. 17. As shown in FIG. 17, the first electrodes 114A, 114B, 114C, and 114D respectively include the base electrodes 114Aa, 114Ba, 114Ca, and 114Da and multiple island electrodes 114Ab, 114Bb, 114Cb, and 114Db respectively surround the base electrodes 114Aa, 114Ba, 114Ca, and 114Da in a plan view. In FIG. 17, the portions surrounded by two-dot chain lines are base electrodes. The base electrodes 114Aa, 114Ba, 114Ca, and 114Da are respectively provided with multiple apertures 114Ac, 114Bc, 114Cc, and 114Dc.

In Example 2, the first electrodes 114 each include the island electrodes 114b electrically connected to each other by the lower-layer electrodes 12. Thus, as shown in FIG. 17, at least one island electrode 114Ab of the first electrode 114A is disposed inside at least one aperture 114Bc provided in the base electrode 114Ba of the first electrode 114B that is adjacent to the first electrode 114A in the up/down direction, and at least one island electrode 114Ab is disposed inside at least one aperture 114Dc provided in the base electrode 114Da of the first electrode 114D that is adjacent to the first electrode 114A in the left/right direction. Also, at least one island electrode 114Bb of the first electrode 114B is disposed inside at least one aperture 114Ac provided in the base electrode 114Aa of the first electrode 114A, and at least one island electrode 114Db of the first electrode 114D is disposed inside at least one aperture 114Ac provided in the base electrode 114Aa of the first electrode 114A. Meanwhile, in the first electrode 114A and the first electrode 114C diagonally adjacent to the first electrode 114A, no island electrode of one first electrode is disposed inside of least one aperture provided in the base electrode and/or between the island electrodes of the other first electrode.

As shown in FIG. 18, the outer peripheral shape of the positioning areas is a quadrangle, and the first electrodes 114 (base electrodes 114a) are arranged in the line direction and in the column direction in a plane of the dimming panel 2. The first electrodes 114 may each be connected to the drive circuitry 50 via the corresponding connection line 19.

The dimming panel of Example 2 also succeeded in smoothing the change in luminance distribution between adjacent dimming units. In Example 2, the outer peripheral shape of the positioning areas is a quadrangle. Thus, the change in luminance distribution can be smoothed between one first electrode 114A and four adjacent first electrodes in the up and down directions and the left and right directions. In addition, the quadrangular outer peripheral shape of the positioning areas can simplify the relation with the corresponding pixels constituting the image-providing liquid crystal panel and can achieve an easy design. Meanwhile, the change in luminance distribution in the diagonal directions is more smoothed in Example 1 than in Example 2.

Example 3

Figure 19:
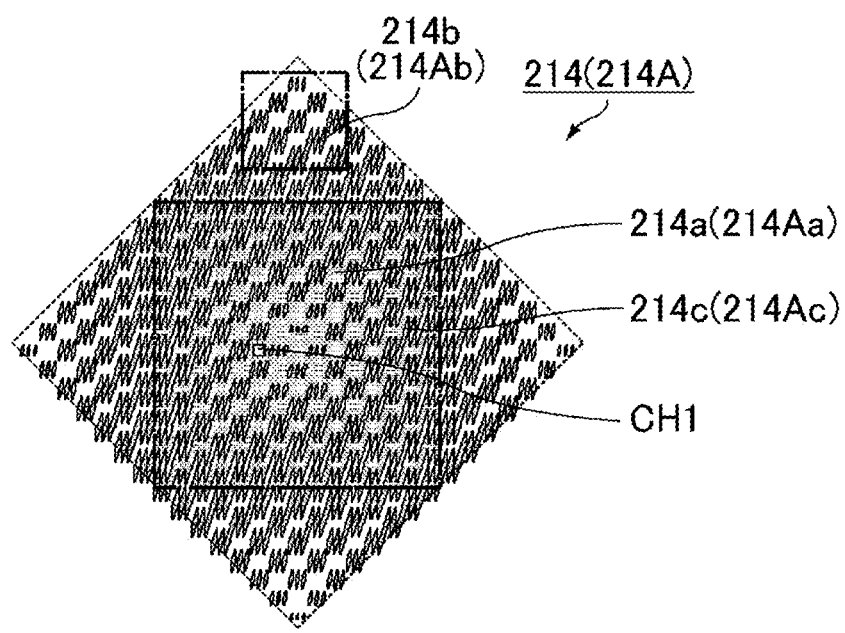
FIG. 19 is a schematic plan view showing one of first electrodes used in a dimming panel of Example 3.
Figure 20:
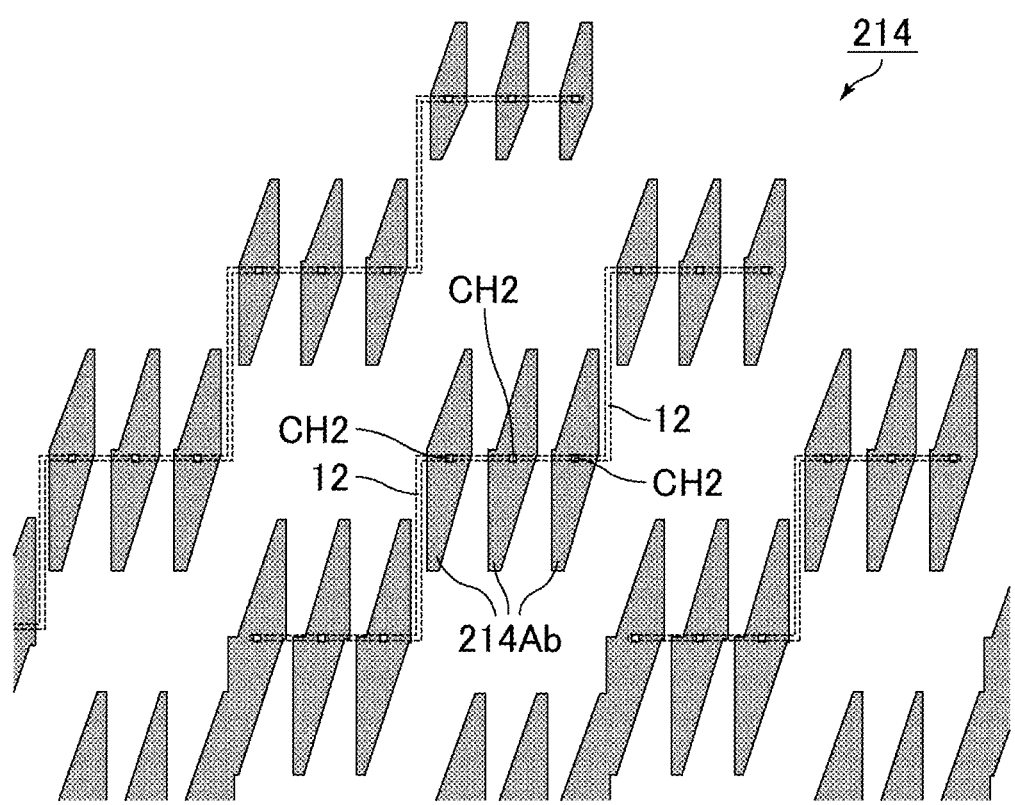
FIG. 20 is a partially enlarged schematic plan view showing an example of island electrodes shown in FIG. 19.
Figure 21:
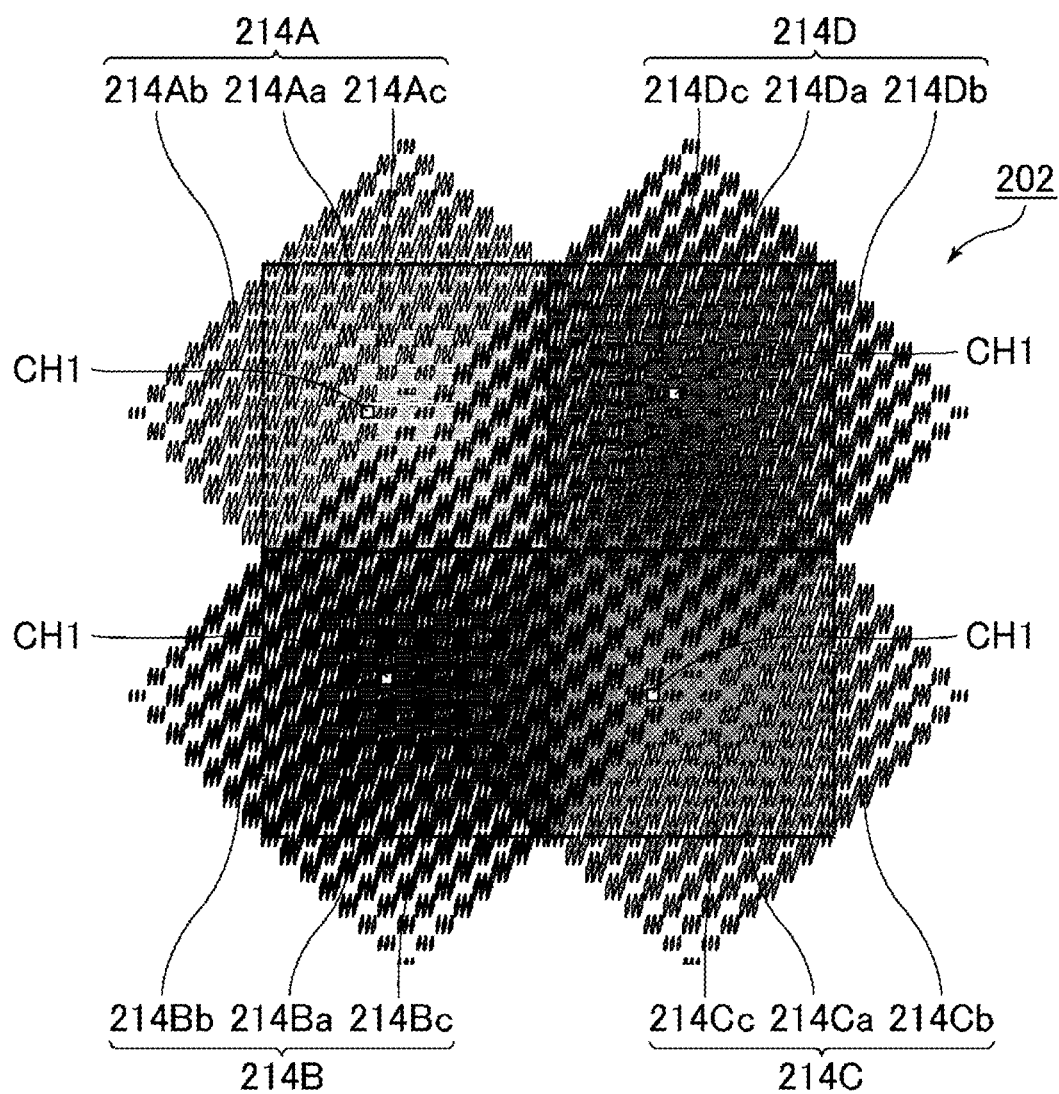
FIG. 21 is a schematic plan view showing an arrangement example of first electrodes shown in FIG. 19.

Hereinafter, a liquid crystal display device of Example 3 is described with reference to FIG. 19 to FIG. 25 and FIG. 27A to FIG. 27C. The liquid crystal display device of Example 3 has the same structure as that of Example 1 except for the structure of the first electrodes used in the dimming panel. The description for the structures similar to the liquid crystal display device of Example 1 is omitted here. FIG. 19 is a schematic plan view showing one of first electrodes used in a dimming panel of Example 3. FIG. 20 is a partially enlarged schematic plan view showing an example of the island electrodes shown in FIG. 19. FIG. 20 is an enlarged schematic plan view showing a part of the island electrodes surrounded by one-dot chain lines shown in FIG. 19. FIG. 21 is a schematic plan view showing an arrangement example of first electrodes shown in FIG. 19. In FIG. 19 and FIG. 21, the portions surrounded by two-dot chain lines are base electrodes.

As shown in FIG. 19, the outer peripheral shape of the positioning areas for locating the first electrodes in Example 3 is a quadrangle (square). Each base electrode 214a is provided with multiple apertures 214c (214Ac). Multiple island electrodes 214b (214Ab) surround the base electrode 214a in a plan view. The island electrodes 214b are arranged in a manner that the electrode area decreases from the center of the base electrode 214a toward the outer periphery of the first electrode 214. The apertures 214c are arranged in a manner that the aperture area increases from the center of the base electrode 214a toward the outer periphery of the first electrode 214.

In FIG. 20, the lower-layer electrode 12 disposed in a layer below the island electrodes 214Ab is shown by dotted lines, and contact holes CH2 connecting the island electrodes 214Ab and the lower-layer electrode 12 are shown by white squares. For example, as shown in FIG. 20, three island electrodes 214Ab aligned in the line direction may be connected to each other by the lower-layer electrode 12 and diagonally arranged island electrodes 214Ab may also be connected to each other by the lower-layer electrode 12.

Similarly to Example 2, the outer peripheral shape of the positioning areas is a quadrangle in Example 3. Thus, one first electrode 214A is adjacent to four other first electrodes with its four sides as boundaries. Also, the first electrodes 214 each include the island electrodes 214b electrically connected to each other by the lower-layer electrodes 12. Thus, as shown in FIG. 21, at least one island electrode 214Ab of the first electrode 214A is disposed inside at least one aperture 214Bc provided in a base electrode 214Ba of a first electrode 214B and inside at least one aperture 214Dc provided in a base electrode 214Da of a first electrode 214D, the first electrodes 214B and 214D being adjacent to the first electrode 214A respectively in the up/down direction and in the left/right direction with one of the four peripheral sides of the base electrode 114Aa as a boundary. Also, at least one island electrode 214Bb of the first electrode 214B is disposed inside at least one aperture 214Ac provided in the base electrode 214Aa of the first electrode 214A, and at least one island electrode 214Db of the first electrode 214D is disposed inside at least one aperture 214Ac provided in the base electrode 214Aa of the first electrode 214A. Meanwhile, in the first electrode 214A and the first electrode 214C diagonally adjacent to the first electrode 214A, no island electrode of one first electrode is disposed inside at least one aperture provided in the base electrode and/or between the island electrodes of the other first electrode.

In the first electrodes 214 used in Example 3, the planar shape of the island electrodes 214b and the outer peripheral shape of the apertures 214c are different from those of the first electrodes 114 used in Example 2. As shown in FIG. 19, in Example 3, at least one island electrode 214b has an outer peripheral shape including linear portions, and at least one of the liner portions forms an angle of −30° to +30° with the extending direction D3 of the linear electrodes 16a of the second electrode 16. Also, at least one aperture 214c has an outer peripheral shape including a linear portion that forms an angle of −30° to +30° with the extending direction D3 of the linear electrodes 16a of the second electrode 16.

Figure 22:
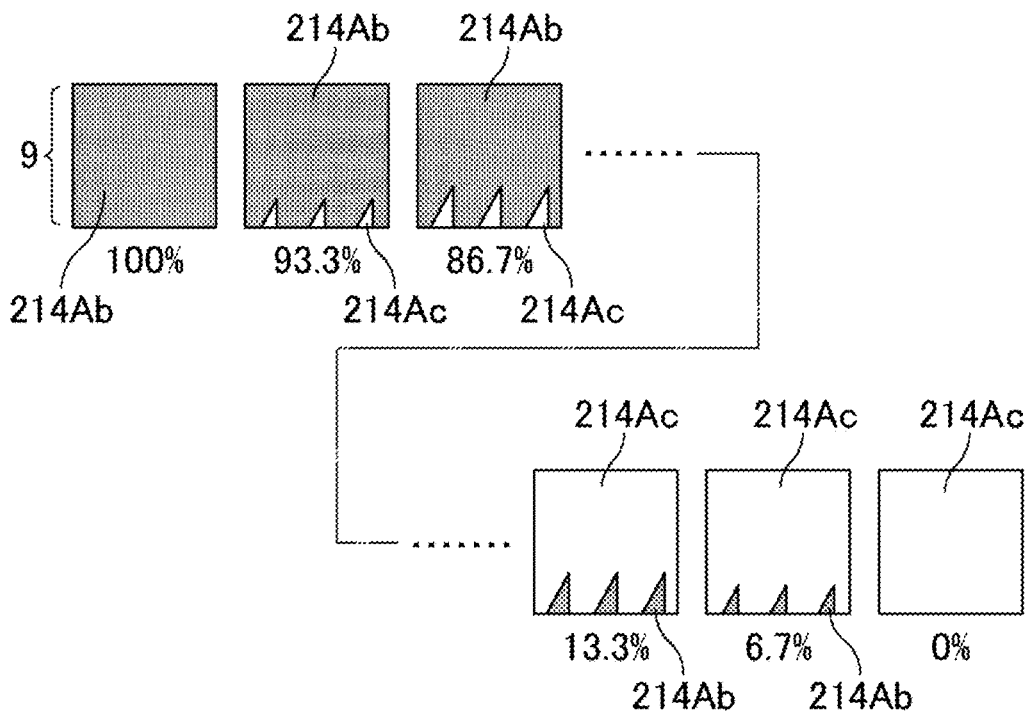
FIG. 22 is a schematic view for describing a manner for reducing the electrode area of the island electrodes in Example 3.

FIG. 22 is a schematic view for describing a manner for reducing the electrode area of the island electrodes in Example 3. As shown in FIG. 22, the areas of the island electrodes 214Ab overlapping the pixels 9 of the image-providing liquid crystal panel are set in 16 grades, for example. Provided that the electrode area of an electrode portion overlapping the entire surface of one pixel 9 is defined as 100%, the electrode areas overlapping the respective pixels 9 gradually decrease, such as 93.3%, 86.7%, and go on, from the center of the first electrode 214A toward the outer periphery of the first electrode 214A.

Figure 23:
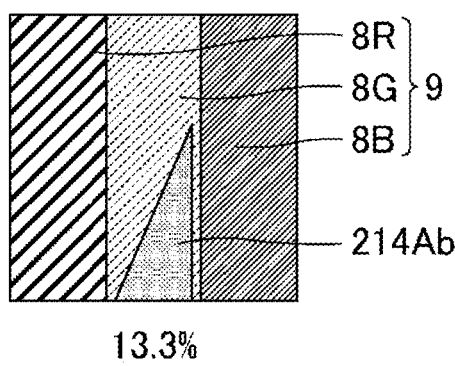
FIG. 23 is a schematic plan view showing an example of disposing an island electrode with reference to one pixel in Example 3.
Figure 24:
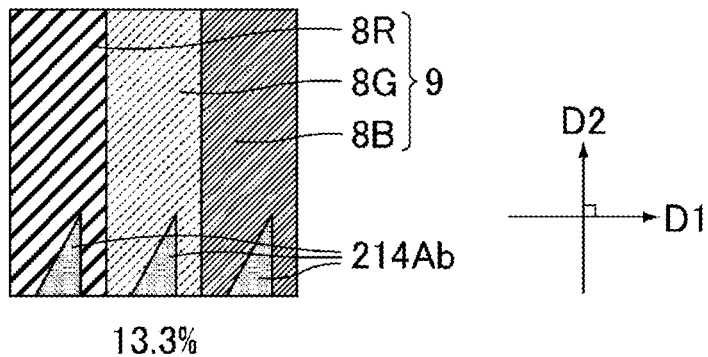
FIG. 24 is a schematic plan view showing a preferred example of disposing island electrodes with reference to one pixel in Example 3.

FIG. 23 is a schematic plan view showing an example of disposing an island electrode with reference to one pixel in Example 3. FIG. 24 is a schematic plan view showing a preferred example of disposing island electrodes with reference to one pixel in Example 3. FIG. 23 and FIG. 24 each show a case where the electrode area of island electrode(s) overlapping one pixel 9 (overlapping electrode portion) is 13.3%. The overlapping electrode portion is preferably disposed in a manner that no color deviation is caused when the dimming panel 2 is stacked above the image-providing liquid crystal panel 1. As shown in FIG. 23, the pixel 9 includes a red sub-pixel 8R, a green sub-pixel 8G, and a blue sub-pixel 8B. Here, when one island electrode 214Ab (overlapping electrode portion) overlaps the green sub-pixel 8G only, for example, the amount of light transmitted through the green sub-pixel 8G is smaller than the amount of light transmitted through the red sub-pixel 8R and the blue sub-pixel 8B, which may result in color deviation causing a failure in providing a desired color. Accordingly, as shown in FIG. 24, three island electrodes 214Ab are preferably disposed for one pixel 9, and the difference between the maximum value and the minimum value among the electrode area overlapping the red sub-pixel 8R, the electrode area overlapping the green sub-pixel 8G, and the electrode area overlapping the blue sub-pixel 8B is preferably 30% or less of the maximum value. Provided that the red sub-pixel 8R, the green sub-pixel 8G, and the blue sub-pixel 8B are aligned in the direction D1, adjusting the electrode widths of the three island electrodes in the direction D2 that is perpendicular to the direction D1 allows control of the electrode areas.

Figure 25:
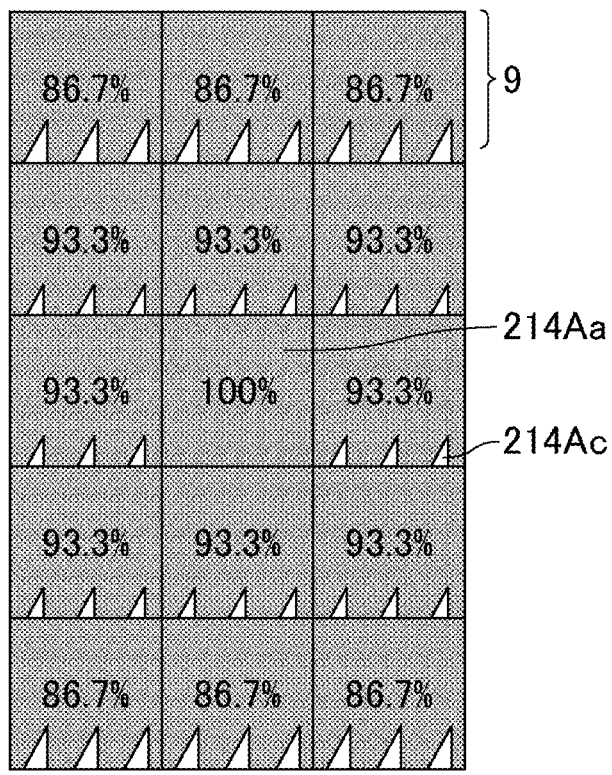
FIG. 25 is a schematic plan view showing an example of disposing apertures in base electrodes in Example 3.
Figure 26:
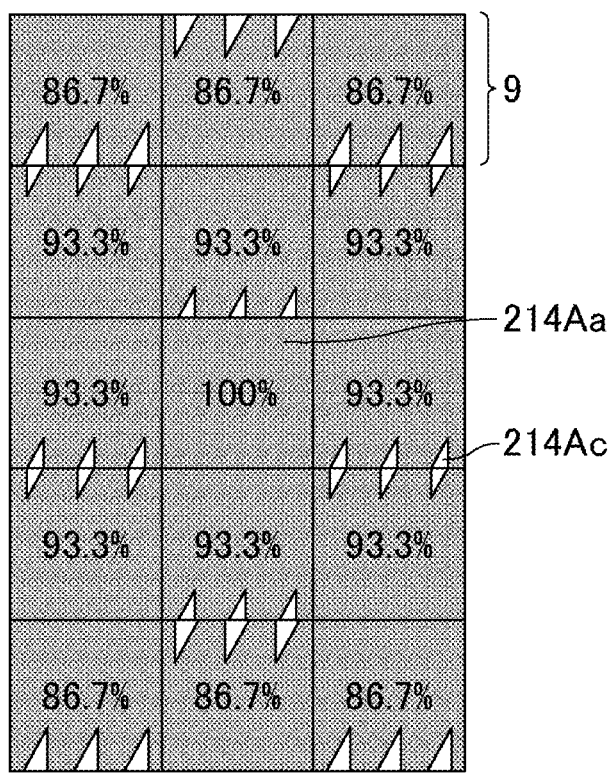
FIG. 26 is a schematic plan view showing a preferred example of arranging apertures in base electrodes in Example 3.

FIG. 25 is a schematic plan view showing an example of disposing apertures in the base electrodes in Example 3. FIG. 26 is a schematic plan view showing a preferred example of arranging apertures in the base electrodes in Example 3. The numbers (%) shown in FIG. 25 and FIG. 26 each indicate the proportion of the electrode area overlapping one pixel 9 (overlapping electrode portion) relative to the area of the pixel 9 defined as 100%. The proportion of the area of an aperture overlapping the pixel 9 (overlapping aperture portion) may be appropriately set in consideration of the width (gap width) between two adjacent first electrodes. Accordingly, as the electrode area overlapping one pixel 9 decreases from the center of the base electrode toward the outer periphery, the aperture area overlapping the corresponding pixel 9 increases. When multiple apertures 214Ac (overlapping aperture portions) are aligned in the line direction of the pixels 9 as shown in FIG. 25, dark lines tend to be recognized along the line direction. In contrast, in FIG. 26, two apertures 214Ac adjacent to each other in the D2 direction shown in FIG. 25 are opposed to each other to form one aperture 214Ac. Thereby, the overlapping aperture portions are scattered without being aligned in a specific direction, and thus dark lines can be less recognizable. Collecting the apertures 214Ac or the island electrodes 214Bb as shown in FIG. 26 can reduce the number of apertures on the boundary portions between the first electrodes and thereby can reduce portions that could cause dark lines due to an alignment defect of liquid crystal molecules.

Figure 27A:
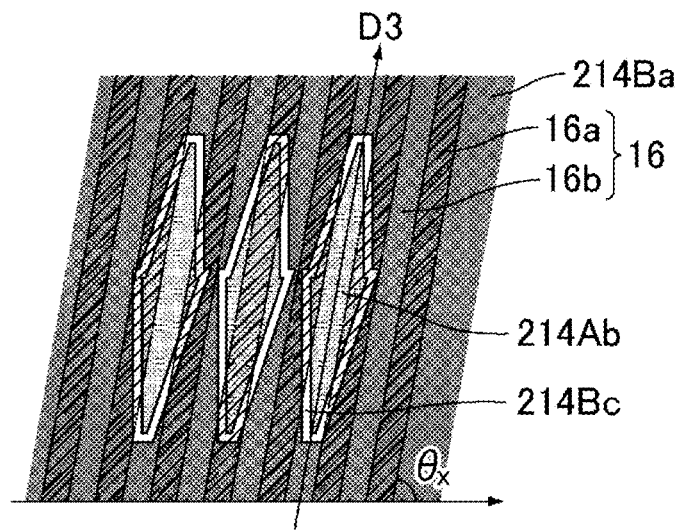
FIG. 27A is an enlarged schematic plan view of a boundary portion between adjacent first electrodes shown in FIG. 21.
Figure 27B:
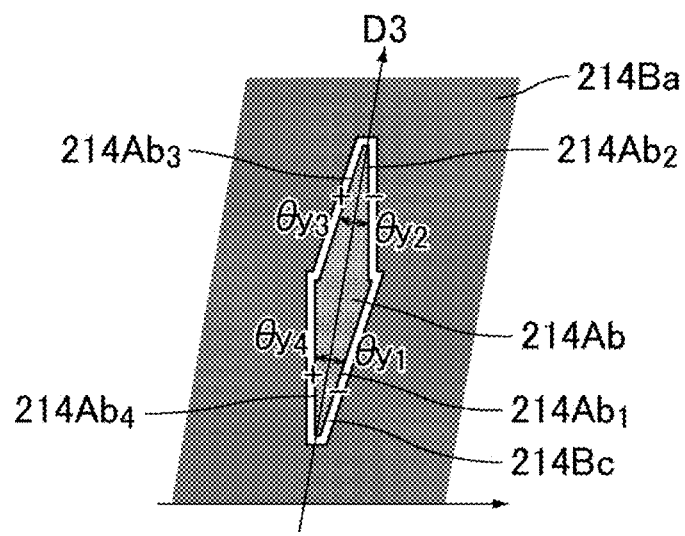
FIG. 27B is an enlarged schematic view for describing an island electrode shown in FIG. 27A.
Figure 27C:
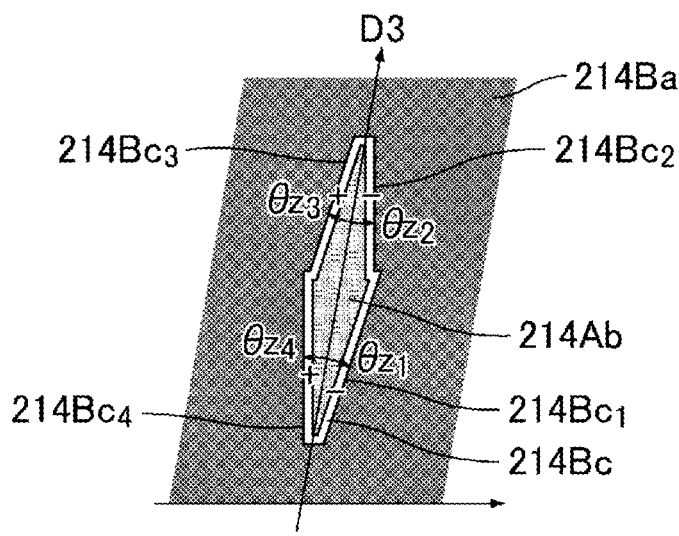
FIG. 27C is an enlarged schematic view for describing an aperture shown in FIG. 27A.

The occurrence of dark lines is described with reference to FIGS. 27A to 27C. FIG. 27A is an enlarged schematic plan view of a boundary portion between adjacent first electrodes shown in FIG. 21. FIG. 27B is an enlarged schematic view for describing an island electrode shown in FIG. 27A. FIG. 27C is an enlarged schematic view for describing an aperture shown in FIG. 27A. FIG. 27A shows an enlarged view of a portion where the island electrodes 214Ab of the first electrode 214A are disposed inside the apertures 214Bc provided in the base electrode 214Ba of the first electrode 214B. Similarly to Example 1, the extending direction D3 of the linear electrodes 16a of the second electrode 16 in Example 3 is set to form an angle θx of 80° with one of the absorption axis of the first polarizer 4 and the absorption axis of the second polarizer 5.

As shown in FIG. 27B, at least one island electrode 214Ab has an outer periphery including, for example, four linear portions $214Ab_1$, $214Ab_2$, $214Ab_3$, and $214Ab_4$. Provided that in a view from the second substrate 40 end, an angle formed in the clockwise direction with respect to the direction D3 is defined to be a negative angle and an angle formed in the counterclockwise direction therewith is defined to be a positive angle and the direction D3 forms angles $θ_{y1}$, $θ_{y2}$, $θ_{y3}$, and $θ_{y4}$ with the linear portions $214Ab_1$, $214Ab_2$, $214Ab_3$, and $214Ab_4$, respectively, at least one angle of $θ_{y1}$, $θ_{y2}$, $θ_{y3}$, or $θ_{y4}$ is preferably −30° to +30°, more preferably −15° to +15°. All of the angles $θ_{y1}$, $θ_{y2}$, $θ_{y3}$, and $θ_{y4}$ may be −30° to +300 or −15° to +15°.

As shown in FIG. 27C, similarly to the island electrodes, the first electrode 214B adjacent to the first electrode 214A includes at least one aperture 214Bc having an outer periphery including, for example, four linear portions $214Bc_1$, $214Bc_2$, $214Bc_3$, and $214Bc_4$ in the base electrode 214Ba.

Provided that the direction D3 forms angles $\theta z_1$, $\theta z_2$, $\theta z_3$, and $\theta z_4$ with the linear portions $214Bc_1$, $214Bc_2$, $214Bc_3$, and $214Bc_4$, respectively, at least one angle of $\theta_{z1}$, $\theta_{z2}$, $\theta_{z3}$, or $\theta_{z4}$ is preferably −30° to +30°, more preferably −15° to +15°. All of the angles $\theta_{z1}$, $\theta_{z2}$, $\theta_{z3}$, and $\theta_{z4}$ may be −30° to +30° or −15° to +15°.

In FIG. 25, one aperture 214Ac has a triangle outer peripheral shape including three linear portions, whose two linear portions each form an angle of −30° to +30° with the direction D3. Meanwhile, in FIG. 26, one aperture 214Ac has a parallelogram-like outer peripheral shape including four linear portions. All the four linear portions form an angle of −30° to +30° with the direction D3. Thus, the occurrence of dark lines between adjacent first electrodes can be more restricted in the case of arranging apertures as in FIG. 26 than in the case of arranging apertures as in FIG. 25.

The dimming panel of Example 3 also succeeded in smoothing the change in luminance distribution between adjacent dimming units. Similarly to Example 2, the quadrangular outer peripheral shape of the positioning areas for locating the first electrodes in Example 3 can simplify the relation with the corresponding pixels constituting the image-providing liquid crystal panel and can achieve an easy design. Furthermore, the planar shape of the island electrodes and the outer peripheral shape of the apertures provided in the base electrodes each include multiple linear portions, and at least one linear portion forms a predetermined angle with the extending direction of the linear electrodes of the second electrode. Thus, the occurrence of dark lines between adjacent first electrodes can be more restricted and an increase in luminance can be more achieved than in Example 2. Also, a reduction in display quality caused by dark lines can be restricted. Meanwhile, the change in luminance distribution in the diagonal directions is more smoothed in Example 1 than in Example 3 in which the outer peripheral shape of the positioning areas is a quadrangle as in Example 2. Moreover, in order to prevent color deviation, the complicated planar shapes of the island electrodes require formation of an island electrode for each sub-pixel included in the pixels constituting the image-providing liquid crystal panel. The design of the island electrodes thus becomes complicated.

Example 4

Example 4 is a combination of the first electrodes used in Example 1 shown in FIG. 3 with the planar shape of the island electrodes and the outer peripheral shape of the apertures provided in the base electrodes of the first electrodes used in Example 3. In Example 4, similarly to the structure shown in FIG. 4, the outer peripheral shape of the positioning areas for locating the first electrodes is a hexagon. In a plan view, multiple island electrodes are concentrically arranged from the center of a first electrode and thereby surround its base electrode. Similarly to Example 3, the planar shape of the island electrodes and the outer peripheral shape of the apertures provided in the base electrode each include multiple linear portions, and at least one linear portion forms an angle of −30° to +30° with the extending direction D3 of the linear electrodes of the second electrode.

Similarly to Example 1, the change in luminance distribution can be smoothed between one first electrode and the adjacent first electrodes in six directions in Example 4. Furthermore, similarly to Example 3, the occurrence of dark lines between adjacent first electrodes can be restricted and the luminance can be increased. Also, a reduction in display quality caused by dark lines can be restricted. Meanwhile, similarly to Example 1, the hexagonal outer peripheral shape of the positioning areas complicates the relation with the corresponding pixels constituting the image-providing liquid crystal panel. Moreover, similarly to Example 3, in order to prevent color deviation, the complicated planar shapes of the island electrodes require a complicated design.

Example 5

Figure 28:
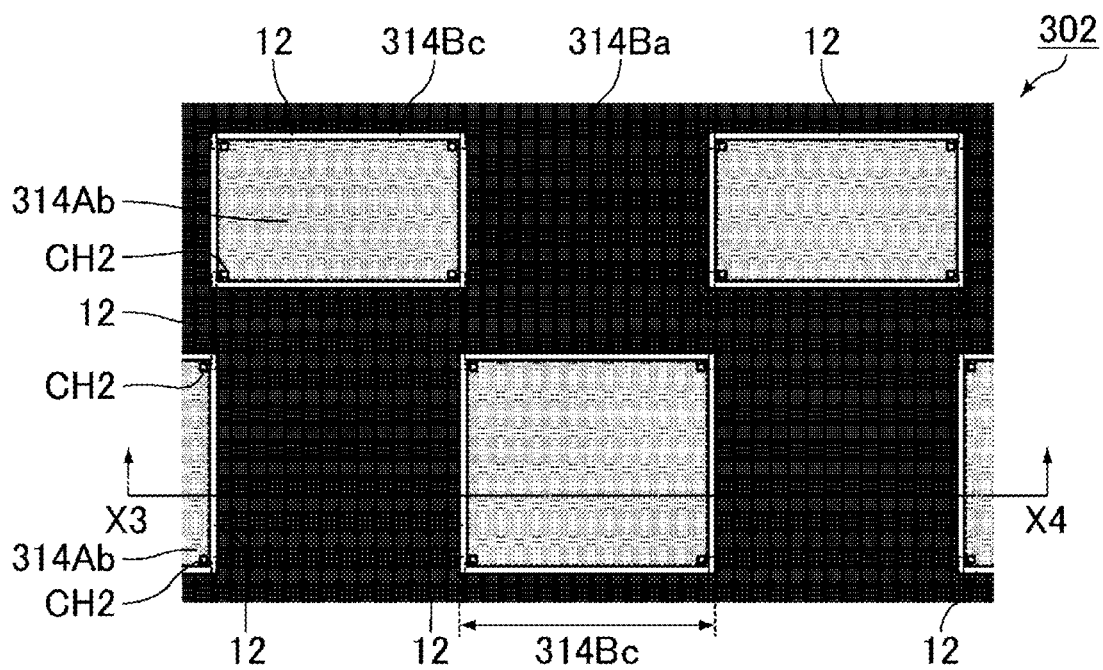
FIG. 28 is a schematic plan view showing an example of disposing a lower-layer electrode in Example 5.
Figure 29:
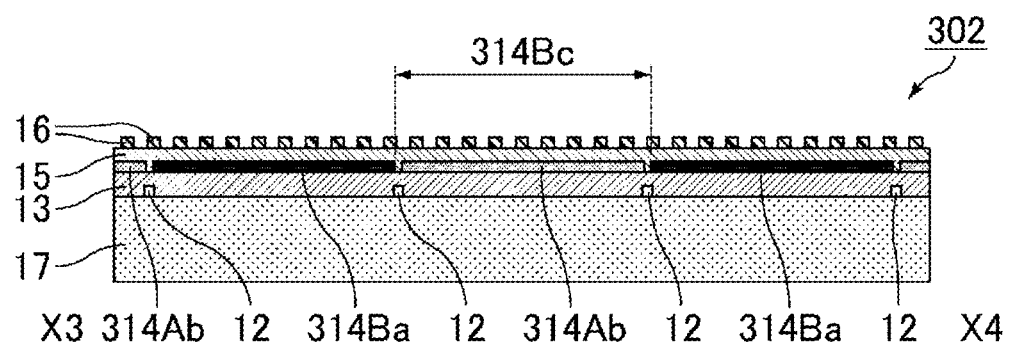
FIG. 29 is a schematic cross-sectional view of the first substrate shown in FIG. 28.
Figure 30:
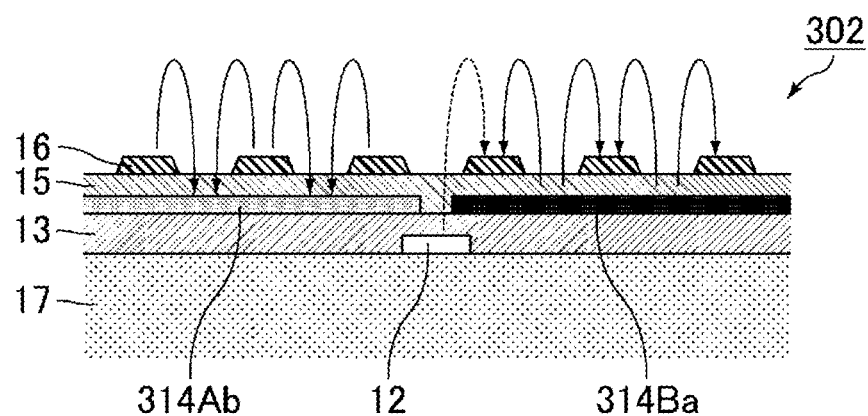
FIG. 30 is an enlarged schematic cross-sectional view showing a part of FIG. 29.

Hereinafter, a liquid crystal display device of Example 5 is described with reference to FIG. 28 to FIG. 30. The liquid crystal display device of Example 5 has the same structure as that of Example 1 except for the design of the lower-layer electrode. The description for the structures similar to the liquid crystal display device of Example 1 is omitted here. FIG. 28 is a schematic plan view showing an example of disposing a lower-layer electrode in Example 5. FIG. 29 is a schematic cross-sectional view of the first substrate shown in FIG. 28. FIG. 29 is a schematic cross-sectional view taken along the line X3-X4 in FIG. 28. FIG. 30 is an enlarged schematic cross-sectional view showing a part of FIG. 29. FIG. 29 and FIG. 30 are each an enlarged view of the first substrate shown in FIG. 2, and the structure from the insulating substrate 11 to the third insulating layer 17 is not shown.

FIG. 28 shows a case where in two adjacent first electrodes as shown in FIG. 4, an island electrode 314Ab is disposed inside an aperture 314Bc provided in a base electrode 314Ba of a next first electrode 314B. As shown in FIG. 28, the lower-layer electrode 12 may be formed in a cyclic shape along the outer periphery of the island electrode 314Ab in a plan view. As shown in FIG. 28 and FIG. 29, the lower-layer electrode 12 may overlap a space between the island electrode 314Ab and the base electrode 314Ba in a plan view.

As shown in FIG. 30, the island electrode 314Ab of one first electrode and the base electrode 314Ba of the next first electrode each form an electric field with the second electrode 16 stacked with the insulating layer 15 in between. The space (gap) between the island electrode 314Ab and the base electrode 314Ba tends to have an alignment defect of liquid crystal molecules. In Example 5, the lower-layer electrode 12 overlaps the gap. Thus, an electric field is also formed between the lower-layer electrode 12 and the second electrode 16, and the electric field thus can change the alignment azimuth of liquid crystal molecules located in the gap, whereby the occurrence of dark lines can be restricted. In Example 5, in addition to smoothing the change in luminance between adjacent first electrodes, the occurrence of dark lines is restricted and thereby the transmittance of the dimming panel can be improved. Moreover, the restriction of the occurrence of dark lines allows the boundaries between adjacent first electrodes to be less recognizable, which can more improve the display quality of the dimming panel. Example 5 can be combined with any of Examples 1 to 4.

Comparative Example 1

The dimming panel used in a liquid crystal display device of Comparative Example 1 uses quadrangular electrodes having a waving (zigzag) periphery as segment electrodes disposed for the respective dimming units. Differently from the examples of the present invention, each segment electrode includes no island electrodes and has a structure in which the outer peripheries of adjacent segment electrodes are engaged with each other on the same layer. The liquid crystal display device of Comparative Example 1 is described with reference to FIG. 31 to FIG. 39. The liquid crystal display device of Comparative Example 1 has the same structure as that of Example 1 except for the structure of the segment electrodes, the arrangement of members such as the segment electrodes and the common electrode, and applied voltages, and thus the similar descriptions are omitted here.

Figure 31:
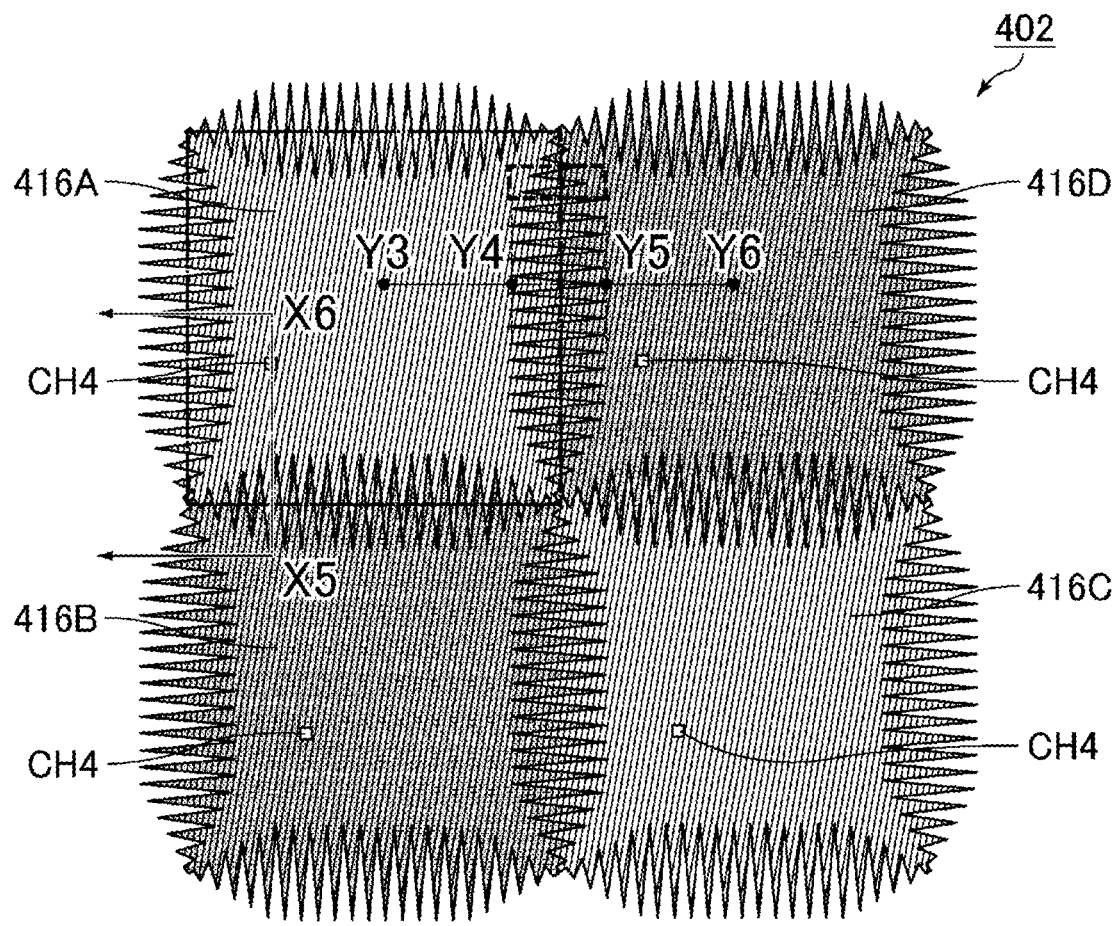
FIG. 31 is a schematic plan view of the planar shape of segment electrodes used in a dimming panel of Comparative Example 1.
Figure 32:
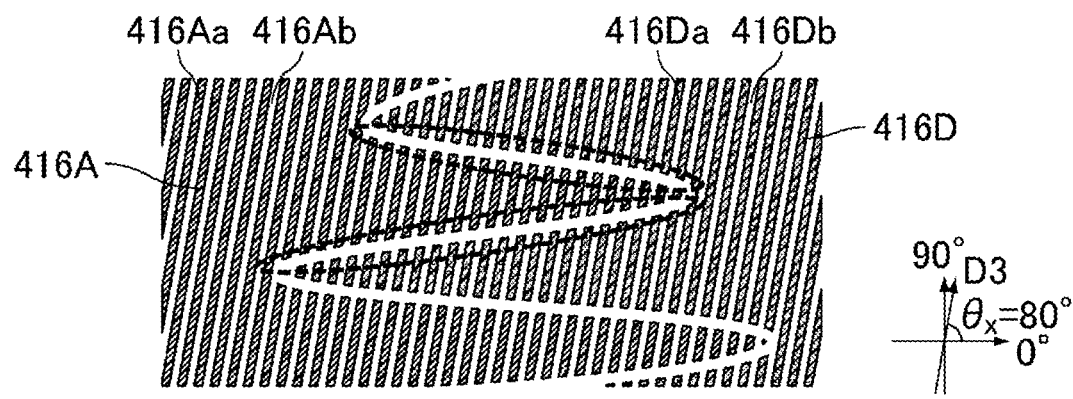
FIG. 32 is an enlarged schematic view showing a boundary portion between adjacent segment electrodes shown in FIG. 31.
Figure 33:
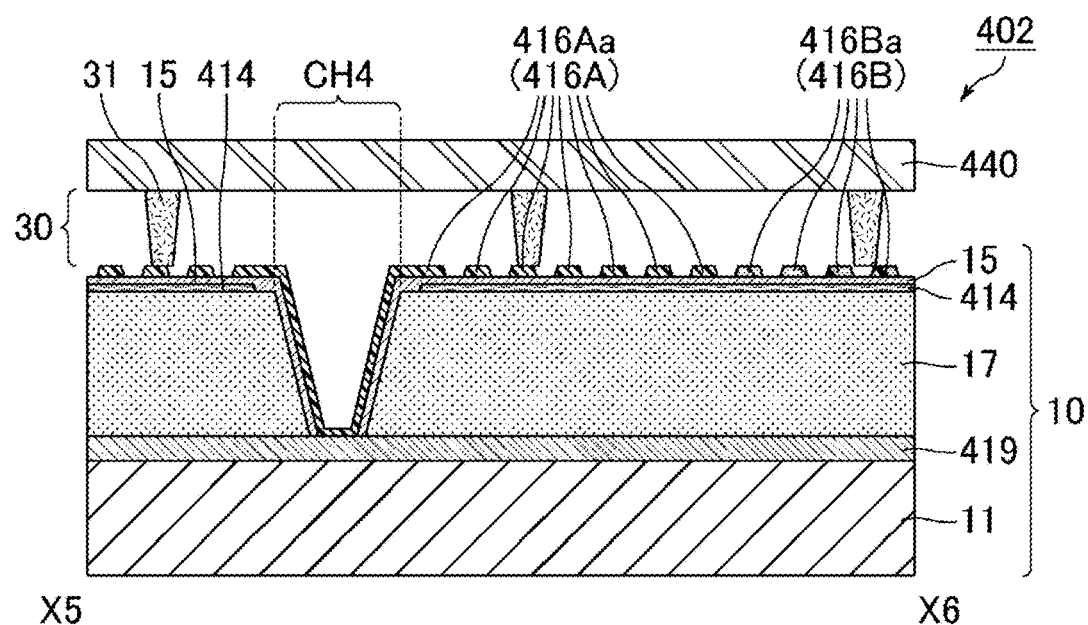
FIG. 33 is a schematic cross-sectional view of the dimming panel used in Comparative Example 1.

FIG. 31 is a schematic plan view of the planar shape of segment electrodes used in a dimming panel of Comparative Example 1. FIG. 32 is an enlarged schematic view showing a boundary portion between adjacent segment electrodes shown in FIG. 31. FIG. 33 is a schematic cross-sectional view of the dimming panel used in Comparative Example 1. In Comparative Example 1, the segment electrodes each provided with multiple linear electrodes, corresponding to the second electrode of Example 1, are disposed for the respective dimming units.

As shown in FIG. 31, segment electrodes 416A, 416B, 416C, and 416D are tidily arranged in a plan view. As shown in FIG. 32, the segment electrode 416A includes multiple linear electrodes 416Aa and is provided with slits 416Ab between adjacent linear electrodes 416Aa. The linear electrodes 416Aa may be electrically connected to each other with, for example, an electrode connecting portion (not shown) formed on the same layer. In the boundary portion between the adjacent segment electrodes 416A and 416B, the segment electrodes are opposed to each other with their outer peripheries engaged with each other.

As shown in FIG. 33, the dimming panel used in the liquid crystal display device of Comparative Example 1 includes a stack sequentially including a common electrode 414, the insulating layer 15, and a segment electrode 416A or 416B from the insulating substrate 11 end. The common electrode 414 may be a solid electrode entirely formed on the first substrate 10 except for the portions with contact holes CH4. The common electrode 414 is connected to, for example, a common line (not shown) disposed on the outer periphery of the dimming panel, and a constant voltage is applied to the common electrode. The segment electrode 416A is connected to the connection line 419 through the contact hole CH4. Although not being shown, the segment electrode 416B is also connected to another connection line 419 through another contact hole. Each connection line 419 is connected to drive circuitry of the liquid crystal display device. In Comparative Example 1, a common voltage (constant voltage) is applied to the common electrode 414, and a predetermined voltage is applied to each of the segment electrodes by the drive circuitry, whereby a fringe electric field is formed between the common electrode 414 and the segment electrode.

Figure 34:
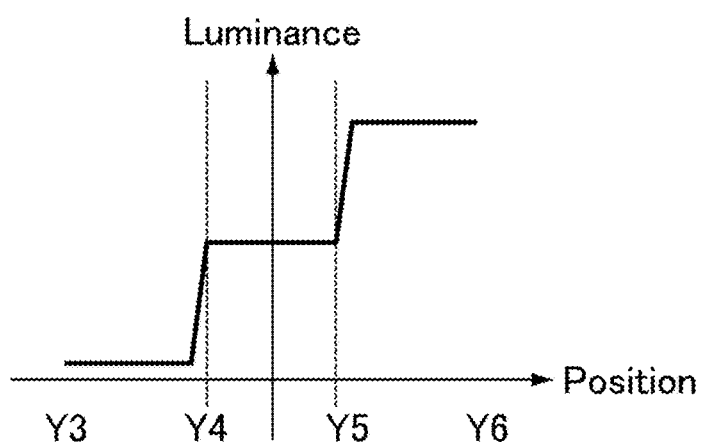
FIG. 34 is a schematic graph showing a change in luminance distribution of the dimming panel used in the liquid crystal display device of Comparative Example 1.
Figure 35:
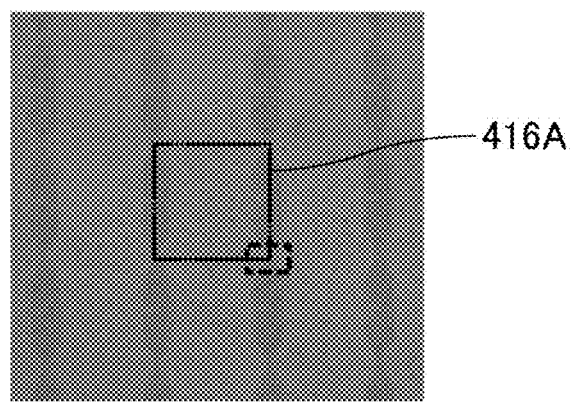
FIG. 35 is a plan photograph of the dimming panel used in Comparative Example 1.
Figure 36:
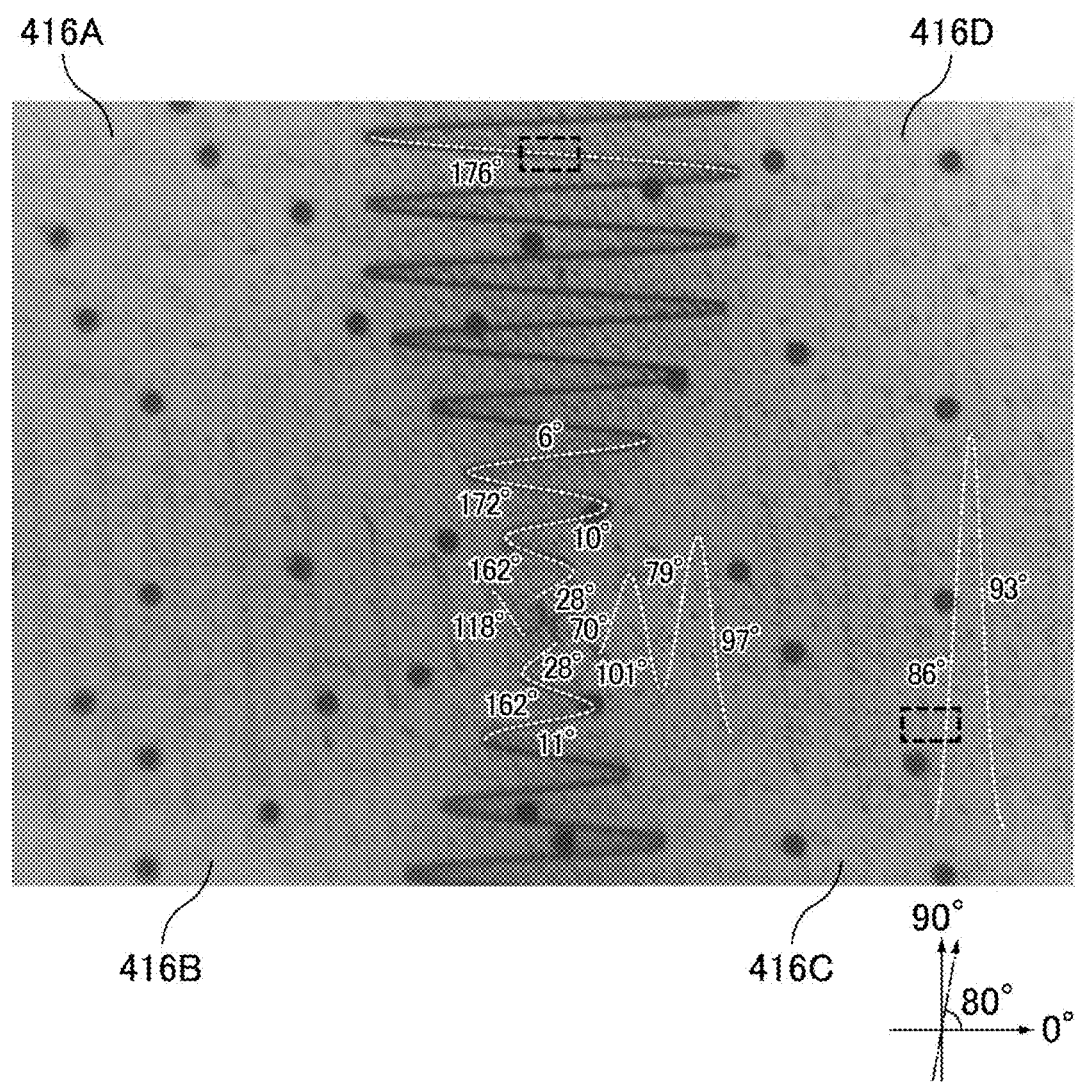
FIG. 36 is an enlarged photograph showing a part of FIG. 35.
Figure 37:
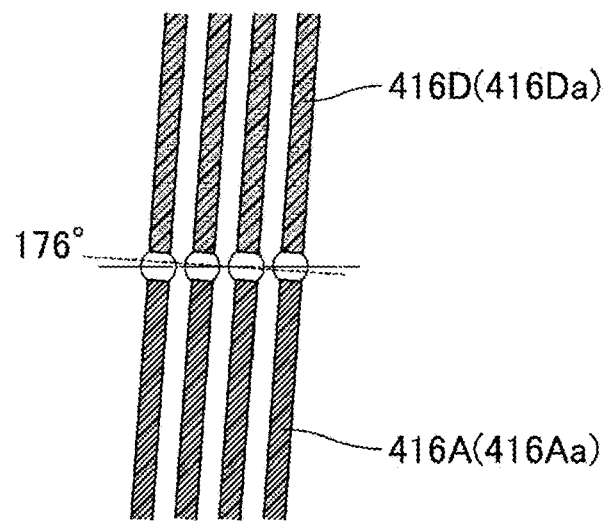
FIG. 37 is a schematic plan view for describing a 176° portion of FIG. 36.
Figure 38:
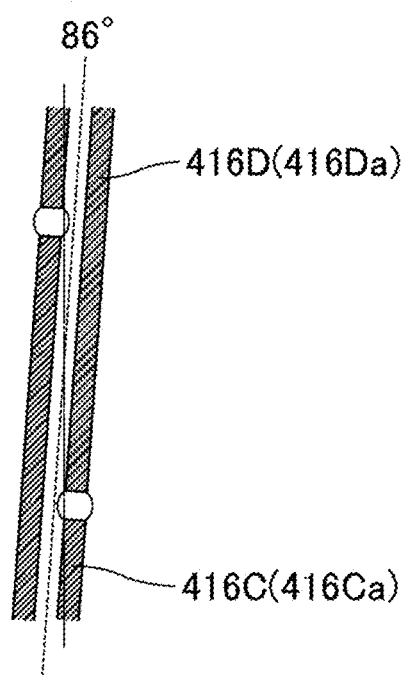
FIG. 38 is a schematic plan view for describing an 86° portion of FIG. 36.

FIG. 34 is a schematic graph showing a change in luminance distribution of the dimming panel used in the liquid crystal display device of Comparative Example 1. In Comparative Example 1, the boundary portion between adjacent segment electrodes has a zigzag shape. As shown in FIG. 34, the boundary portion merely has a middle gray scale between the gray scales of adjacent dimming units, and the luminance distribution between the adjacent dimming units changes in steps. The change in luminance distribution is thus not smooth in comparison with Examples 1 to 5. The change in luminance distribution in Comparative Example 1 is discussed with reference to FIG. 35 to FIG. 38. FIG. 35 is a plan photograph of the dimming panel used in Comparative Example 1. FIG. 36 is an enlarged photograph showing a part of FIG. 35. FIG. 37 is a schematic plan view for describing a 176° portion of FIG. 36. FIG. 38 is a schematic plan view for describing an 86° portion of FIG. 36.

As shown in FIG. 35, dark lines are recognized in one direction in Comparative Example 1. In Comparative Example 1, portions with adjacent segment electrodes opposed to each other are linearly aligned in a plane of the dimming panel, whereby dark lines are presumably recognized. As shown in FIG. 32, the linear electrodes of one segment electrode and the linear electrodes of the next segment electrode are opposed with a space in between in Comparative Example 1. In a portion (also referred to as a gap) where the linear electrodes of the adjacent segment electrodes are opposed, liquid crystal molecules cannot be rotated due to the influence of fringe electric fields. Thus, the liquid crystal molecules cannot be aligned at a desired azimuth in the gap. The region with such an alignment defect of liquid crystal molecules is recognized as a dark line.

Here, the occurrence of dark lines is discussed with reference to FIG. 36 that is an enlarged photograph showing a portion of the photograph shown in FIG. 35. In FIG. 36, provided that an angle formed by a straight line connecting adjacent gaps and the above 0° reference line is defined as a gap angle, a dark line is remarkably recognized in a portion with a gap angle of 176° (+96° with respect to the extending direction of the linear electrode 416Aa). Meanwhile, no dark line is recognized in a portion with a gap angle of 86° (+6° with respect to the extending direction of the linear electrode 416Aa).

Here, a portion with a gap angle of 176° and a portion with a gap angle of 86° are compared. As shown in FIG. 37, in a portion with a gap angle of 176°, adjacent gaps are aligned with small intervals and thus the regions with an alignment defect of liquid crystal molecules are recognized as dark lines. Meanwhile, as shown in FIG. 38, in a portion with a gap angle of 86°, adjacent gaps are aligned with a greater interval. Thus, the regions with an alignment defect of liquid crystal molecules are scattered and are presumably not recognized as a dark line.

Figure 39:
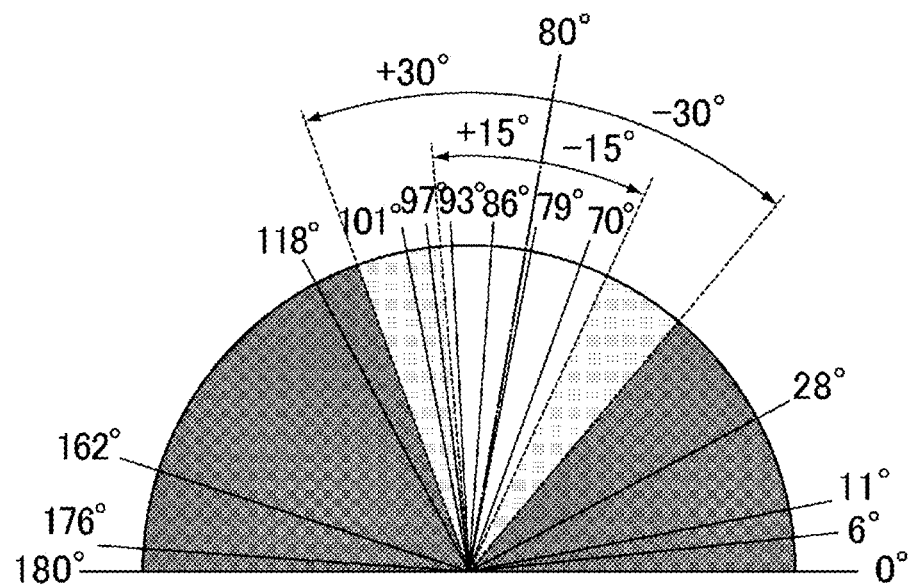
FIG. 39 is a view showing a relation between gap angles and occurrence of dark lines shown in FIG. 36.

FIG. 39 is a view showing a relation between gap angles and occurrence of dark lines shown in FIG. 36. In the semicircle shown in FIG. 39, a darker portion indicates more frequent occurrence of remarkable dark lines, and a lighter portion indicates less frequent occurrence of remarkable dark lines. In Comparative Example 1, in a view from the second substrate 40 end, the extending direction of the multiple linear electrodes 416Aa constituting a segment electrode is set to 80° in the counterclockwise direction with one of the absorption axes of a pair of polarizers sandwiching the dimming panel defined as 0°. FIG. 39 also demonstrates that the gap angle is preferably an angle of −30° to +30°, more preferably −15° to +15°, with respect to the extending direction of the linear electrodes 416Aa.

What is claimed is:
1. A dimming unit comprising:
a dimming panel; and
drive circuitry,
the dimming panel sequentially including a first substrate, a liquid crystal layer, and a second substrate,
the first substrate sequentially including an insulating substrate, a lower-layer electrode, a first insulating layer, multiple first electrodes, a second insulating layer, and a second electrode which is provided with multiple parallel linear electrodes and to which a constant voltage is applied, the first electrodes each including multiple island electrodes which are spaced from each other in a plan view and are electrically connected to each other, at least one of the island electrodes being electrically connected to the lower-layer electrode through a contact hole, the drive circuitry controlling voltages applied to the respective first electrodes.

2. The dimming unit according to claim 1, wherein the island electrodes are arranged in a manner that an electrode area occupancy decreases toward an outer periphery of each of the first electrodes, at least one of the island electrodes of a selected electrode of the first electrodes is disposed in a position between the island electrodes of a next electrode, and at least one of the island electrodes of the next electrode is disposed in a position between the island electrodes of the selected electrode.

3. The dimming unit according to claim 2, wherein the lower-layer electrode overlaps a space between the island electrodes of the selected electrode and the island electrodes of the next electrode in a plan view.

4. The dimming unit according to claim 1, wherein at least one of the island electrodes has a quadrangular planar shape.

5. The dimming unit according to claim 1, wherein at least one of the island electrodes has an outer peripheral shape including a linear portion that forms an angle of −30° to +300 with respect to an extending direction of the linear electrodes of the second electrode, provided that in a view seen from a second substrate end, an angle formed in a clockwise direction is defined to be a negative angle and an angle formed in a counterclockwise direction is defined to be a positive angle.

6. The dimming unit according to claim 1, wherein at least one of the island electrodes has a planar shape including a curved portion.

7. The dimming unit according to claim 1, wherein the first substrate includes multiple connection lines connecting the respective first electrodes and the drive circuitry.

8. The dimming unit according to claim 1, wherein each of the first electrodes further includes a base electrode provided with multiple apertures, the island electrodes surround the base electrode in a plan view, the base electrode is electrically connected to the lower-layer electrode through another contact hole, at least one of the island electrodes of a selected electrode of the first electrodes is disposed in a position inside at least one of the apertures of a next electrode, and at least one of the island electrodes of the next electrode is disposed in a position inside at least one of the apertures of the selected electrode.

9. The dimming unit according to claim 8, wherein the apertures provided in the base electrode are arranged in a manner that an aperture area occupancy increases from a center toward an outer periphery of the base electrode.

10. The dimming unit according to claim 8, wherein the lower-layer electrode overlaps a space between the apertures provided in the base electrode of the selected electrode and the island electrodes of the next electrode in a plan view.

11. The dimming unit according to claim 8, wherein at least one of the apertures has a quadrangular outer peripheral shape.

12. The dimming unit according to claim 8, wherein at least one aperture has an outer peripheral shape including a linear portion that forms an angle of −30° to +30° with respect to an extending direction of the linear electrodes of the second electrode, provided that in a view seen from a second substrate end, an angle formed in a clockwise direction is defined to be a negative angle and an angle formed in a counterclockwise direction is defined to be a positive angle.

13. The dimming unit according to claim 8, wherein at least one of the apertures includes an outer peripheral shape including a curved portion.

14. A liquid crystal display device comprising:

an image-providing liquid crystal panel;

a backlight; and a dimming unit between the image-providing liquid crystal panel and the backlight, the dimming unit comprising:

a dimming panel; and drive circuitry, the dimming panel sequentially including a first substrate, a liquid crystal layer, and a second substrate, the first substrate sequentially including an insulating substrate, a lower-layer electrode, a first insulating layer, multiple first electrodes, a second insulating layer, and a second electrode which is provided with multiple parallel linear electrodes and to which a constant voltage is applied, the first electrodes including multiple island electrodes which are spaced from each other in a plan view and are electrically connected to each other, at least one of the island electrodes being electrically connected to the lower-layer electrode through a contact hole, the drive circuitry controlling voltages applied to the respective first electrodes.

15. The liquid crystal display device according to claim 14, wherein the image-providing liquid crystal panel includes multiple pixels including sub-pixels of multiple colors and being arranged in a matrix in a plane, and the island electrodes include an overlapping electrode portion overlapping the sub-pixels of all colors included in one pixel.

16. The liquid crystal display device according to claim 15, wherein in the overlapping electrode portion, a difference between a maximum value and a minimum value among electrode areas overlapping the respective sub-pixels of the respective colors is 30% or less of the maximum value.

17. The liquid crystal display device according to claim 14, wherein the image-providing liquid crystal panel includes multiple pixels including sub-pixels of multiple colors and being arranged in a matrix in a plane, and the apertures include an overlapping aperture portion overlapping the sub-pixels of all colors included in one pixel.

18. The liquid crystal display device according to claim 17, wherein in the overlapping aperture portion, a difference between a maximum value and a minimum value among aperture areas overlapping the respective subpixels of the respective colors is 30% or less of the maximum value.

* * * * *